United States Patent
Shah

(10) Patent No.: US 11,375,022 B2
(45) Date of Patent: *Jun. 28, 2022

(54) SYSTEM FOR REAL-TIME MANAGEMENT OF SESSION OBJECTS AND FOR APPLICATION PROGRAMMING INTERFACE (API) MOCKING

(71) Applicant: Bank of America Corporation, Charlotte, NC (US)

(72) Inventor: Priyank R. Shah, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,919

(22) Filed: Aug. 23, 2021

(65) Prior Publication Data
US 2022/0070280 A1    Mar. 3, 2022

Related U.S. Application Data

(63) Continuation of application No. 17/001,986, filed on Aug. 25, 2020, now Pat. No. 11,115,502.

(51) Int. Cl.
*G06F 15/16* (2006.01)
*H04L 67/133* (2022.01)
*H04L 67/00* (2022.01)
*H04L 67/131* (2022.01)
*H04L 67/1001* (2022.01)

(52) U.S. Cl.
CPC ........ *H04L 67/133* (2022.05); *H04L 67/1001* (2022.05); *H04L 67/131* (2022.05); *H04L 67/34* (2013.01)

(58) Field of Classification Search
None
See application file for complete search history.

(56) References Cited

U.S. PATENT DOCUMENTS

| 5,548,723 | A | * | 8/1996 | Pettus | G06F 9/547 |
| | | | | | 709/228 |
| 6,122,664 | A | * | 9/2000 | Boukobza | H04L 43/12 |
| | | | | | 709/224 |
| 6,141,689 | A | * | 10/2000 | Yasrebi | H04L 67/40 |
| | | | | | 709/228 |

(Continued)

*Primary Examiner* — Razu A Miah
(74) *Attorney, Agent, or Firm* — Weiss & Arons LLP

(57) ABSTRACT

A system for real-time management of a plurality of session objects and for mocking a plurality of application programming interfaces (APIs). The system may include a cluster of servers. Each server may provide a backend service to a virtual assistant. Each backend service may execute an API. The system may also include a computing device operable to execute the virtual assistant in a test mode. The system may include a communication channel between the computing device and the cluster of servers. The communication channel may transmit API requests from the virtual assistant to the cluster, and JSON responses from the cluster to the virtual assistant. The system may include a mocked-up services server operable to replicate the cluster. The system may include a bypass communication channel between the communication channel and mocked-up services server. The bypass communication channel may redirect API requests to the mocked-up services server.

18 Claims, 29 Drawing Sheets

(56) References Cited

U.S. PATENT DOCUMENTS

| | | | | |
|---|---|---|---|---|
| 6,546,425 | B1* | 4/2003 | Hanson | H04L 1/1887 709/227 |
| 8,126,722 | B2* | 2/2012 | Robb | H04L 67/16 705/26.1 |
| 2007/0214224 | A1* | 9/2007 | Nam | G06Q 10/107 709/206 |
| 2007/0226354 | A1* | 9/2007 | Bang | H04M 15/44 709/227 |
| 2009/0006604 | A1* | 1/2009 | Dhupelia | H04L 67/1014 709/223 |
| 2010/0333115 | A1 | 12/2010 | Yospe et al. | |
| 2011/0184993 | A1* | 7/2011 | Chawla | G06F 9/45558 718/1 |
| 2011/0185355 | A1* | 7/2011 | Chawla | G06F 9/45558 718/1 |
| 2013/0019242 | A1 | 1/2013 | Chen et al. | |
| 2013/0065694 | A1 | 3/2013 | Kim et al. | |
| 2013/0262387 | A1 | 10/2013 | Varadharajan et al. | |
| 2014/0047001 | A1* | 2/2014 | Phillips | H04W 4/00 709/202 |
| 2015/0213355 | A1* | 7/2015 | Sharma | H04W 12/082 706/11 |
| 2016/0043892 | A1 | 2/2016 | Hason et al. | |
| 2016/0057107 | A1 | 2/2016 | Call et al. | |
| 2016/0087933 | A1* | 3/2016 | Johnson | H04L 67/125 709/245 |
| 2017/0300402 | A1* | 10/2017 | Hoffner | G06F 11/3612 |
| 2019/0116110 | A1* | 4/2019 | Raney | H04L 43/12 |
| 2019/0384699 | A1 | 12/2019 | Arbon et al. | |

\* cited by examiner

```
object > responseMap
☐ ▼ JSON Editor {63}
    ⋮⋮⋮ ☐   firstName: JINAN-01 —— 104
    ⋮⋮⋮ ☐   dateOfBirth: XX/XX/XXXX —— 108
    ⋮⋮⋮ ☐   state: XX —— 110
    ⋮⋮⋮ ☐   ▶ address {5} —— 112
    ⋮⋮⋮ ☐   partyId: XXXXXXXXX
    ⋮⋮⋮ ☐   guid:762XXXX-XXXX-XXXX-XXXX-XXXXXXXXXXXX,
    ⋮⋮⋮ ☐   onlineId: mar_XXXXX
    ⋮⋮⋮ ☐   bandEligibility:___false
    ⋮⋮⋮ ☐   preferredRewardsEnrolled:___false
    ⋮⋮⋮ ☐   preferredRewardsEligible: ✓true
    ⋮⋮⋮ ☐   relationshipRewardsEnrolled:___false
    ⋮⋮⋮ ☐   relationshipRewardsEligible___false
    ⋮⋮⋮ ☐   lobIndicator: XXX
    ⋮⋮⋮ ☐   singleServiceCustomer:___false
    ⋮⋮⋮ ☐   creditScoreEnrollmentElibility: ✓true
    ⋮⋮⋮ ☐   creditScoreServiceEnrolled: ✓true
    ⋮⋮⋮ ☐   optEnabledIndicator:___false
    ⋮⋮⋮ ☐   optEnrolledIndicator:___false
    ⋮⋮⋮ ☐   pushNotificationsEligible: ✓true
    ⋮⋮⋮ ☐   pushNotificationsEnrolled:___false
    ⋮⋮⋮ ☐   claimsCaseIndicator:___false
    ⋮⋮⋮ ☐   hasDepositAccounts: ✓true —— 114
    ⋮⋮⋮ ☐   hasConsumerDepositAccounts: ✓true
    ⋮⋮⋮ ☐   ▲ EligibilitySet [8]
    ⋮⋮⋮ ☐   dateOfBankAnniversary: XXXXXXXXXXXXXX
    ⋮⋮⋮ ☐   preferredLanguage: en
```

FIG. 1

Virtual Assistant Session Management
This is a dashboard to view and update session details Active Session
Total Sessions: 1 — 204

| Online ID | ACH Session ID | Actions |
|---|---|---|
| mar_XXXXX | G53D XXXXXXXXXXXXXXX | XXXXXXXXXXXXXXX [Details] |

[Logs active Session]

Session Details
Online ID — 206
G53D

Device ID — 208
G53D

210 — [Update Session]

Device Info
App Version and Build

[Session] Consumer Service Resources
Code

Session Details

Online ID: mar_XXXX    G53D    XXXXXXXXXXXXXXXXX    Device Info    Mobile Phone X    Device ID XXXXXXXXXXXXXXXXX    App Version and Build 20.05.6524

[Update Session]

Session [Customer] Service Resources    Account    Insights

[Insight Name] XXXXX - Duplicate Charges ▼    [Add]

Insight Summary

Code

```
{
  "channel": {
    "code": "XXXXX"
  },
  "caseIdentifier": {
    "caseNumber": XXXXXXXXXXXXXXX
  },
  "expirationTimestamp": XXXXXXXXXXXXXXX
  "identifier": {
    "code": "XXXXX",
    "messageId": "XXXXXXXXXXX",
    "type": {
      "name": "XXXXXX"
    },
  "subChannel": {
    "code": "XXXXX"
  },
  "template": {
    "identifier": "XX"
```

Insight Details

Code

```
"identifier": {
  "insightType": "XXXXXX",
  "insightTrigger": "XXXXXX",
  "insightRecordType": "X",
  "insightTimestamp": XXXXXXXXXXXXXX
  "insightAlternateKey1": {
    "code": "XXXXXXXX",
    "value": "XXXXXXXX",
  "partyId": XXXXXXXXXXXX
  "lastFourAccountNumber": "XXXXXX",
  "accountProductCode": "XXXXX"
  "identifier":
  "insightDataSchemaId": null,
  "lastUpdatedByAgentId": null,
```

---

2700

12:49  ✕    — 2702

Here are your insights.

○ Duplicate Charges    [View]    — 2704
You may have been charged more than once for the same item.

○ Savings Opportunity    [View]    — 2706
Pay off your credit card debt faster.

LEARN ABOUT INSIGHTS

[Show me my insights]

Type or ask me something

SYSTEM FOR REAL-TIME MANAGEMENT OF SESSION OBJECTS AND FOR APPLICATION PROGRAMMING INTERFACE (API) MOCKING

CROSS-REFERENCE TO RELATED APPLICATION

This application is a continuation of U.S. patent application Ser. No. 17/001,986 filed on Aug. 25, 2020, now U.S. Pat. No. 11,115,502, and entitled "SYSTEM FOR REAL-TIME MANAGEMENT OF SESSION OBJECTS AND FOR APPLICATION PROGRAMMING INTERFACE (API) MOCKING" which is hereby incorporated by reference herein in its entirety.

FIELD OF TECHNOLOGY

Aspects of the disclosure relate to a virtual assistant testing environment.

BACKGROUND OF THE DISCLOSURE

Virtual assistants may include software applications that communicate with humans via audio, visual or textual channels. Virtual assistants have become more common in recent years. As time progresses, virtual assistants are taking the place of human assistants. The software applications rely on numerous backend systems in order to power a user interface of the virtual assistant. These virtual assistants are trained to perform human-like actions and respond to human requests via the user interface.

In order to ensure that a virtual assistant provides appropriate assistance in a production environment, virtual assistants are vigorously tested. Such tests may test the virtual assistant for accuracy and quality control. In fact, virtual assistant testing environments are created in order to test the virtual assistant.

During the testing, virtual assistants may interact with the numerous backend systems in order to retrieve data and logic necessary to power the virtual assistant. However, communication with the backend systems may be cumbersome. Additionally, when testing multiple different human-like profiles, backend data conditioning may be required. For the purposes of this application, backend data conditioning may be understood to mean changing data and making revisions to human-like profiles. The backend data conditioning may be cumbersome and lengthy. This cumbersome process may impede the testing process.

Therefore, it may be desirable to provide a mocked-up backend system that powers the virtual assistant during testing. The mocked-up backend system may provide transparency to the testing environment and dramatically shorten the testing process.

SUMMARY OF THE DISCLOSURE

A system is provided for real-time management of Hypertext Transfer Protocol (HTTP) session objects and/or attributes, and for mocking of any and all backend API's with which the HTTP session objects and/or attributes interface. For the purposes of this application, mocking may be understood to mean replicating to a minimum degree in order to maintain the operability of an application. The system may communicate with a remote live backend system. Real-time management may include viewing, adding or modifying the HTTP session objects and/or attributes in a local environment. The system may generate mocked-up data. The system may generate API stubs. API stubs may be pieces of software code that are used to stand-in for the full API. API stubs may simulate the behavior of APIs included in a backend system. The API stubs may be imported into the system for development and testing.

The system may be able to configure a particular scenario and/or suite of test cases from based on the mocked-up data and API stubbing. The mocked-up data may be used to test a virtual assistant. Such a system removes the need for lengthy communications and/or wait times between production data that is included in the live backend system and the virtual assistant development system. In addition, the virtual assistant is unaware of the origin of the data. As such, the virtual assistant is unaware of the origin of the data it is being received. Therefore, to the virtual assistant, there is no differentiation between data that originated at a live backend system or data that originated at a local system that includes mocked-up data and API stubs. Because the virtual assistant is unaware of the origin of the data, the virtual assistant may be accurately tested using the system that includes mocked-up data and API stubs.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative diagram in accordance with principles of the disclosure;

FIG. 2 shows another illustrative diagram in accordance with principles of the disclosure;

FIG. 4 shows still another illustrative diagram in accordance with principles of the disclosure;

FIG. 6 shows still another illustrative diagram in accordance with principles of the disclosure;

FIG. 8 shows still another illustrative diagram in accordance with principles of the disclosure;

FIG. 9 shows yet another illustrative diagram in accordance with principles of the disclosure;

FIG. 11 shows yet another illustrative diagram in accordance with principles of the disclosure;

FIG. 12 shows still another illustrative diagram in accordance with principles of the disclosure;

FIG. 13 shows yet another illustrative diagram in accordance with principles of the disclosure;

FIG. 14 shows still another illustrative diagram in accordance with principles of the disclosure;

FIG. 15 shows yet another illustrative diagram in accordance with principles of the disclosure;

FIG. 18 shows still another illustrative diagram in accordance with principles of the disclosure;

FIG. 19 shows yet another illustrative diagram in accordance with principles of the disclosure;

FIG. 20 shows still another illustrative diagram in accordance with principles of the disclosure;

FIG. 26 shows still another illustrative diagram in accordance with principles of the disclosure;

FIG. 27 shows yet another illustrative diagram in accordance with principles of the disclosure;

FIG. 28 shows still another illustrative diagram in accordance with principles of the disclosure; and FIG. 29 shows yet another illustrative diagram in accordance with principles of the disclosure.

DETAILED DESCRIPTION OF THE DISCLOSURE

Figure 3:
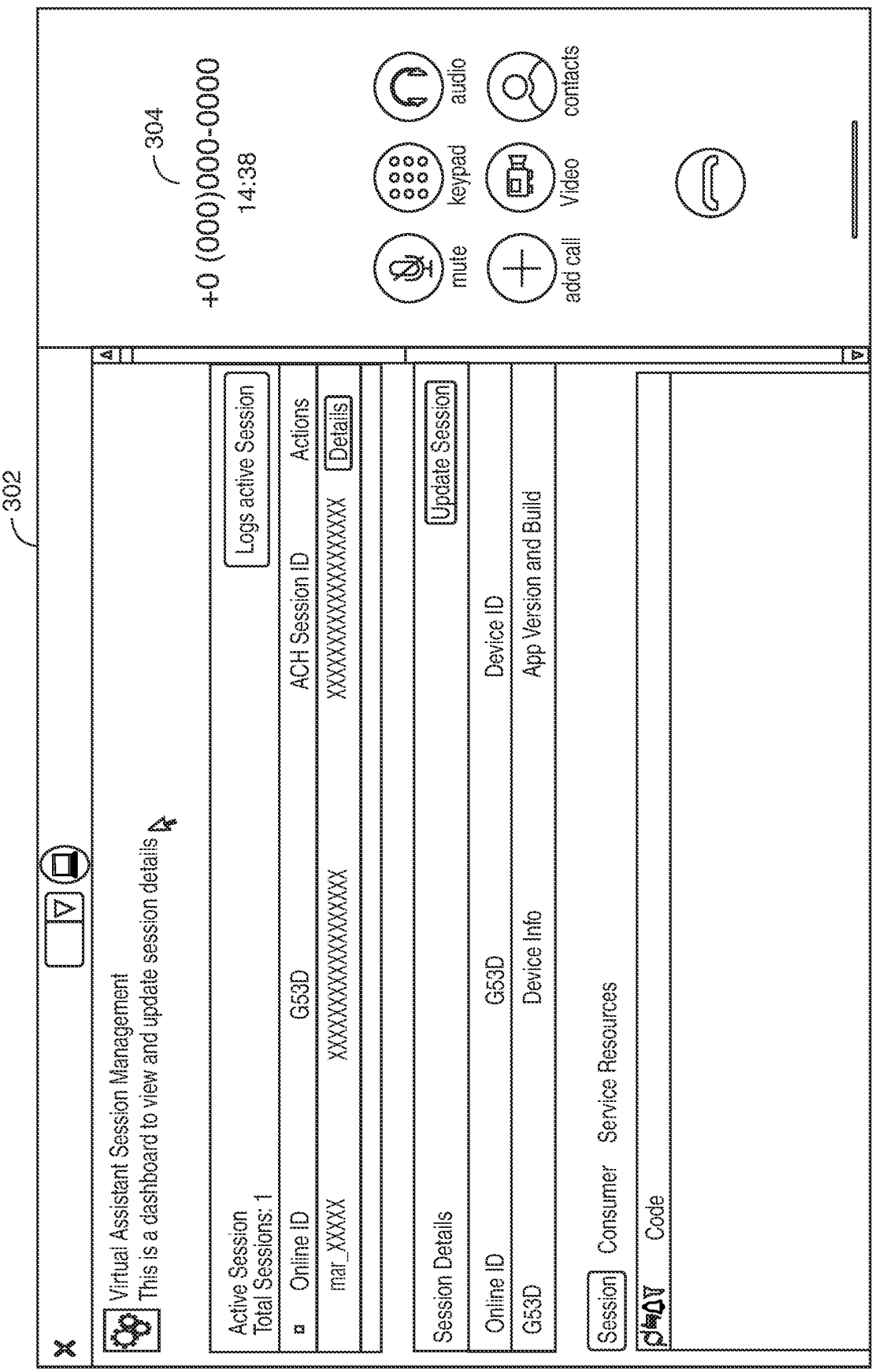
FIG. 3 shows yet another illustrative diagram in accordance with principles of the disclosure.

Systems for, and methods involving, real-time management of a plurality of HTTP session objects and/or attributes, and for mocking a plurality of application programming interfaces (APIs) is provided. The plurality of APIs may be the APIs which interface with the plurality of HTTP session objects and/or attributes. Such a system may include a virtual assistant. Such a system may also include a cluster of backend services servers. Each backend services server may provide a backend service to a virtual assistant. Each backend service may execute an API from among the plurality of APIs. Examples of an API may include a human-like profile data provider and an insight data provider.

The system may also include a computing device. The computing device may be operable to execute the virtual assistant in a test mode. The computing device may also be operable to execute the virtual assistant in a production mode. The computing device may be a mobile device, smartphone, tablet, personal computer (PC), server or any other suitable computing device. The computing device may include a processor, a transmitter, a receiver and any other suitable components of a computing device.

In some embodiments, the virtual assistant may utilize the plurality of HTTP session objects and/or attributes during execution. HTTP session objects may represent a user session. The user session may be used by the virtual assistant to identify the user during HTTP requests between the virtual assistant and the backed system or the mocked-up backed system. HTTP session attributes may be variable and/or static characteristics relating to the user session.

The system may also include a communication channel. The communication channel may link the computing device and the cluster of backend services servers. The communication channel may be operable to transmit a plurality of API requests from the virtual assistant to the cluster of backend services servers. The communication channel may also be operable to transmit JavaScript Object Notation (JSON) responses from the cluster of backend services servers to the computing device.

The system may also include a mocked-up services server. The mocked-up services server may be operable to replicate the cluster of backend services servers. The degree of the replication of the cluster of backend services servers may be to the extent necessary to operate a current executable frame of the virtual assistant in the test mode.

The system may include a bypass communication channel. The bypass communication channel may link the communication channel and the mocked-up services server. The bypass communication channel is activated when the virtual assistant is executed in test mode. The bypass communication channel may redirect the API request received from the virtual assistant to the mocked-up services server.

The computing device may also be operable to execute the virtual assistant in a production mode. In the production mode, the backend services servers may receive the API request, process the API request and transmit a JSON response to the API request.

In some embodiments, the virtual assistant may, upon receipt of the JSON responses, execute one or more executable frames that utilize one or more of the plurality of API requests. The JSON responses may include API stubs.

In some embodiments, the computing application is duped—i.e., misled—to identify the origin of the JSON responses as the cluster of backed services servers.

Methods for real-time management of a plurality of session objects and for mocking a plurality APIs is provided. Methods may include receiving an API request at a backend services server cluster. The backend server cluster may comprise the plurality of APIs.

The method may include rerouting the API request from the backend services server cluster to a mocked-up services server. The mocked-up services server may be located at a remote location from the backend services server cluster. The rerouting may occur prior to, after, or concurrent with, the cluster of backend services servers receiving the plurality of API requests.

The method may include processing a JSON response to the API request. The processing may be executed at the mocked-up services server. The JSON response may include real-time data. The real-time data may be based on a current profile active at the mocked-up services server.

The method may also include transmitting the JSON response from the mocked-up services server to the virtual assistant testing environment. The transmitting may be injected into a JSON response channel. The JSON response channel may communicate communications between the backend services server cluster and the virtual assistant testing environment.

The method may include executing a feature test within the virtual assistant testing environment. The execution of the feature test may utilize the received JSON response. The virtual assistant testing environment may be oblivious to— i.e., unaware of—the rerouting of the request and an origin of the JSON response.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows JSON editor 102. JSON editor 102 shows a sample JSON response to an API request. The API request may include a request for profile information. The JSON response may include a sample human profile. The sample profile may include details such as first name (104), date of birth (108), state of residence (110) and address information (112).

The sample JSON response may also include various Boolean details regarding the sample human profile. Such Boolean details may include has deposit accounts yes/no (114).

FIG. 2 shows an illustrative diagram. The illustrative diagram shows screenshot 202. Screenshot 202 may be a dashboard that is being used by a testing developer. The testing developer may log into the dashboard to view active testing sessions, shown at 204. Sessions details, including online identifier (206) and device identifier (208) may be shown on screenshot 202.

A developer may select update session button, shown at 210, in order to log into the active session.

FIG. 3 shows an illustrative diagram. The illustrative diagram shows screenshot 302. Screenshot 302 shows the developer dashboard on the left and a virtual assistant testing environment (304) on the right. The virtual assistant testing environment may test a virtual assistant as it would be displayed on a mobile device.

Figure 4:
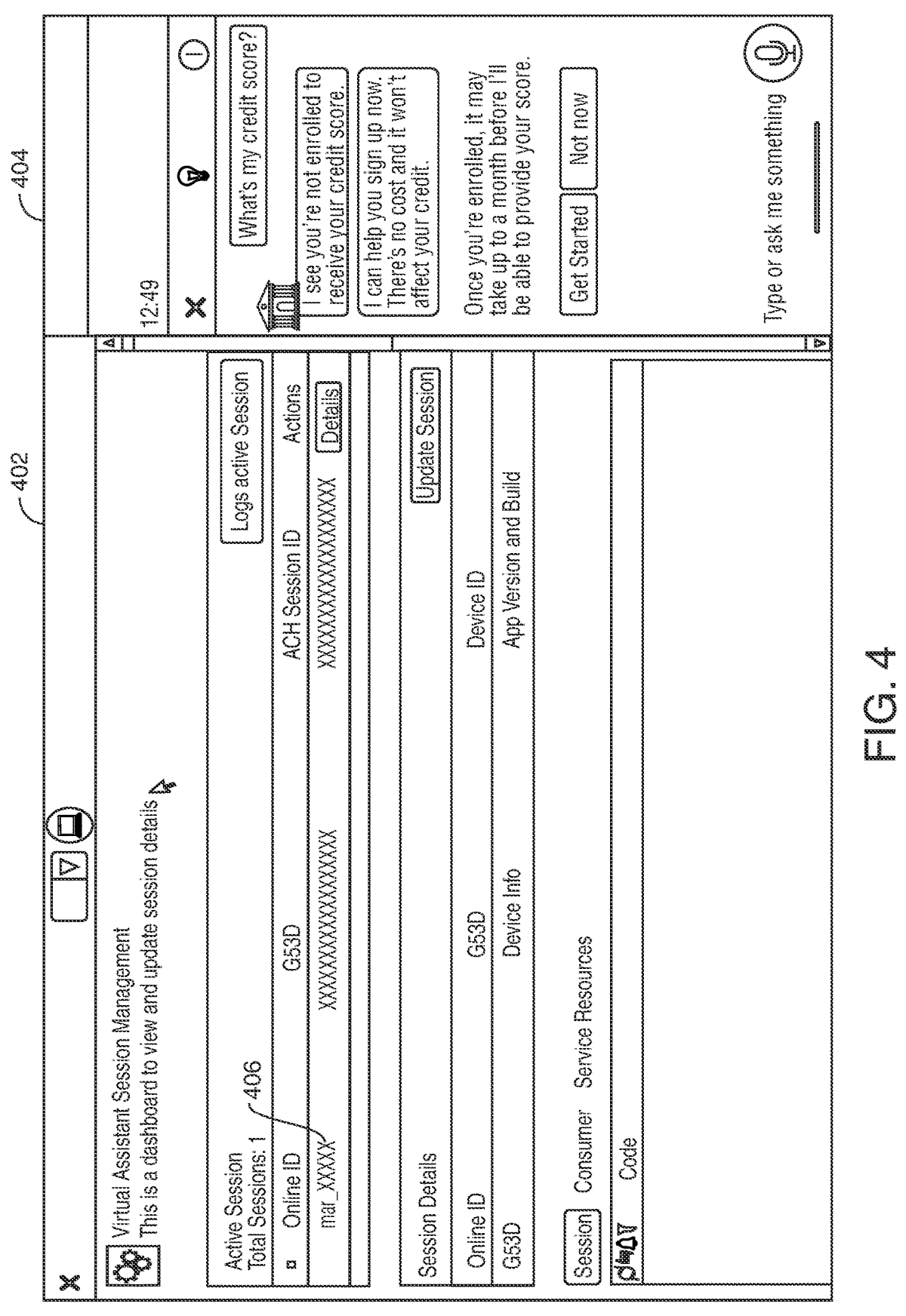

FIG. 4 shows an illustrative diagram. The illustrative diagram shows screenshot 402. Screenshot 402 includes virtual assistant testing environment 404.

Within virtual assistant testing environment 404, a development tester may test the answer to "What's my credit score?" The virtual assistant testing environment response may include "I see you're not enrolled to receive your credit score" and "I can help you sign up now. There's no cost and it won't affect your credit." The response to the credit score query may be powered by the online active testing session identified at 406.

The development tester may require testing of multiple profiles, for example, ones that include high credit scores, medium credit scores, low credit scores, no credit scores and no access to credit scores. However, in order to test those profiles, the developer may utilize the system to access a mocked-up version of the API that is powering the credit score JSON response. Once the mocked-up version is accessed and changed, the developer may be able to view and test the different responses within the virtual assistant testing environment.

Figure 5:
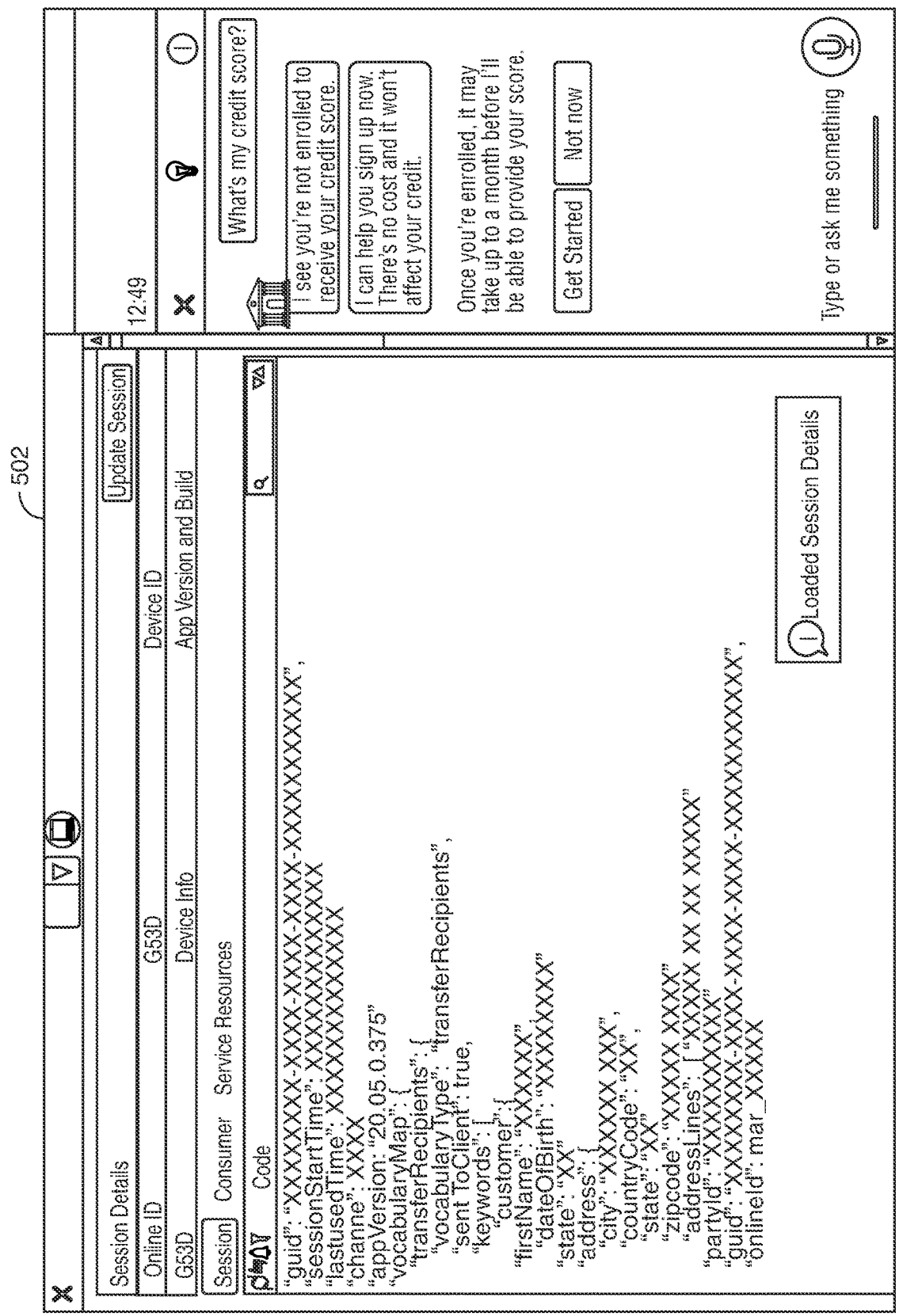
FIG. 5 shows yet another illustrative diagram in accordance with principles of the disclosure.

FIG. 5 shows an illustrative diagram. The illustrative diagram includes screenshot 502. Screenshot 502 includes the virtual assistant testing environment and a mocked-up API. The mocked-up API may show editable details relating to the profile being used to power the virtual assistant testing environment.

Figure 6:
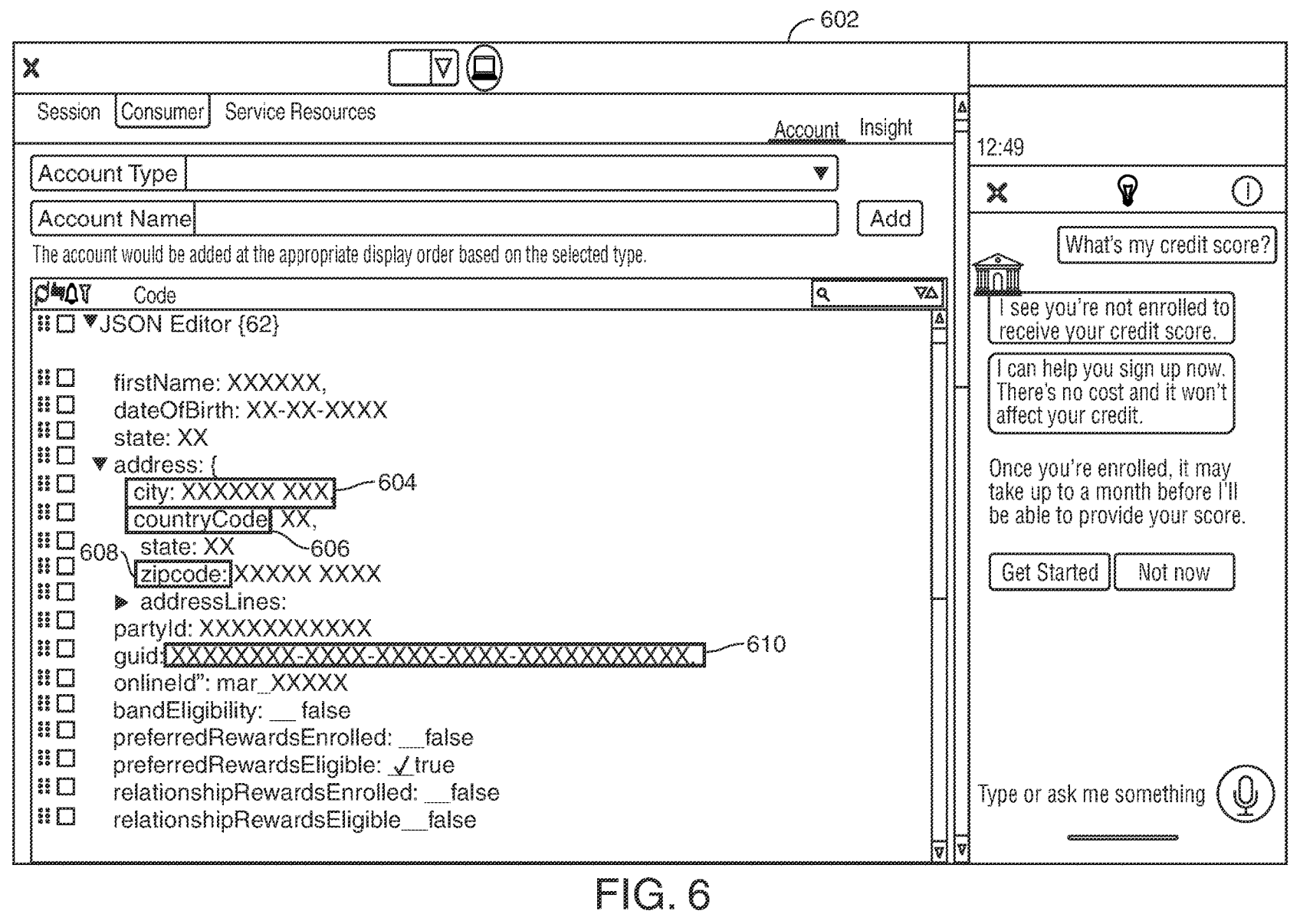

FIG. 6 shows an illustrative diagram. The illustrative diagram includes screenshot 602. Screenshot 602 may enable the developer to add an account to a profile.

Screenshot 602 shows a sample JSON response that may be generated in order to add the account. The JSON response may include various details such as address city—CUTLER BAY (604), country code—US (606), zip code (608), id number (610) and line of business indicator—CON (612).

Figure 7:
FIG. 7 shows yet another illustrative diagram in accordance with principles of the disclosure.

FIG. 7 shows another illustrative diagram. The illustrative diagram shows screenshot 702. Screenshot 702 shows additional details for the addition of an account. Details regarding credit score enrollment eligibility (704) and credit score service enrolled (706) may be displayed.

Figure 8:
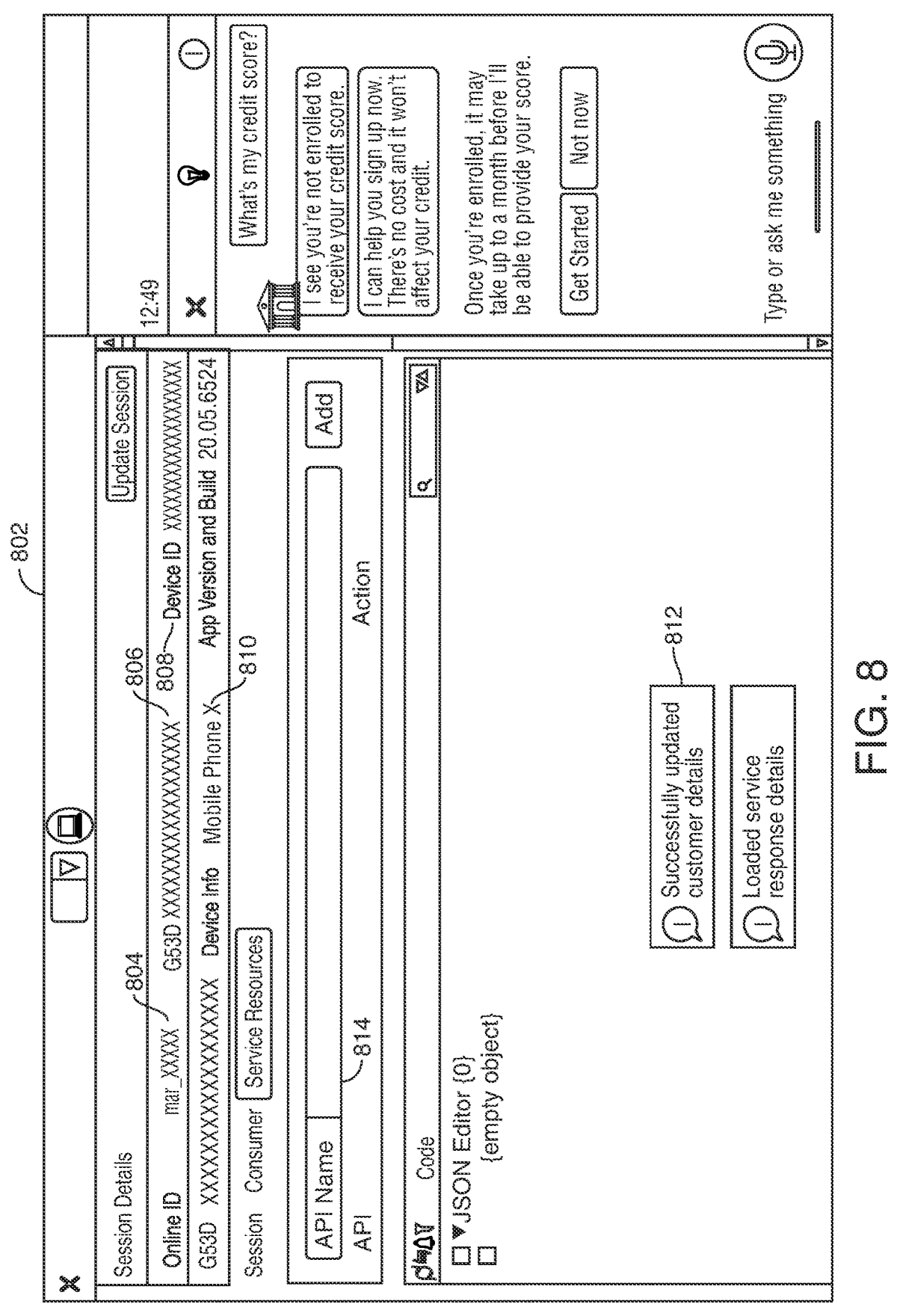

FIG. 8 shows an illustrative diagram. The illustrative diagram shows screenshot 802. Screenshot 802 shows that the customer details that were changed in FIGS. 6 and 7 were successfully updated. Additionally, the session details include an online identifier (804), other identifier (806), device identifier (808) and device information (810) are included in screenshot 802.

API name entry field 814 may enable a developer to enter the name of an API that the developer would like to mock in order to perform a test. The name of the API may be included in a backend services server cluster. The API may be copied to the local session running on the developer's device. The API may be copied after the developer enters the API name into API name entry field 814. In some embodiments, the local system may store API stubs. When the name of an API is received, the API stub may be retrieved instead of the complete API. API stubs may be pieces of software code that are used to stand in for the full API. API stubs may simulate the behavior of APIs included in a live backed system.

Figure 9:
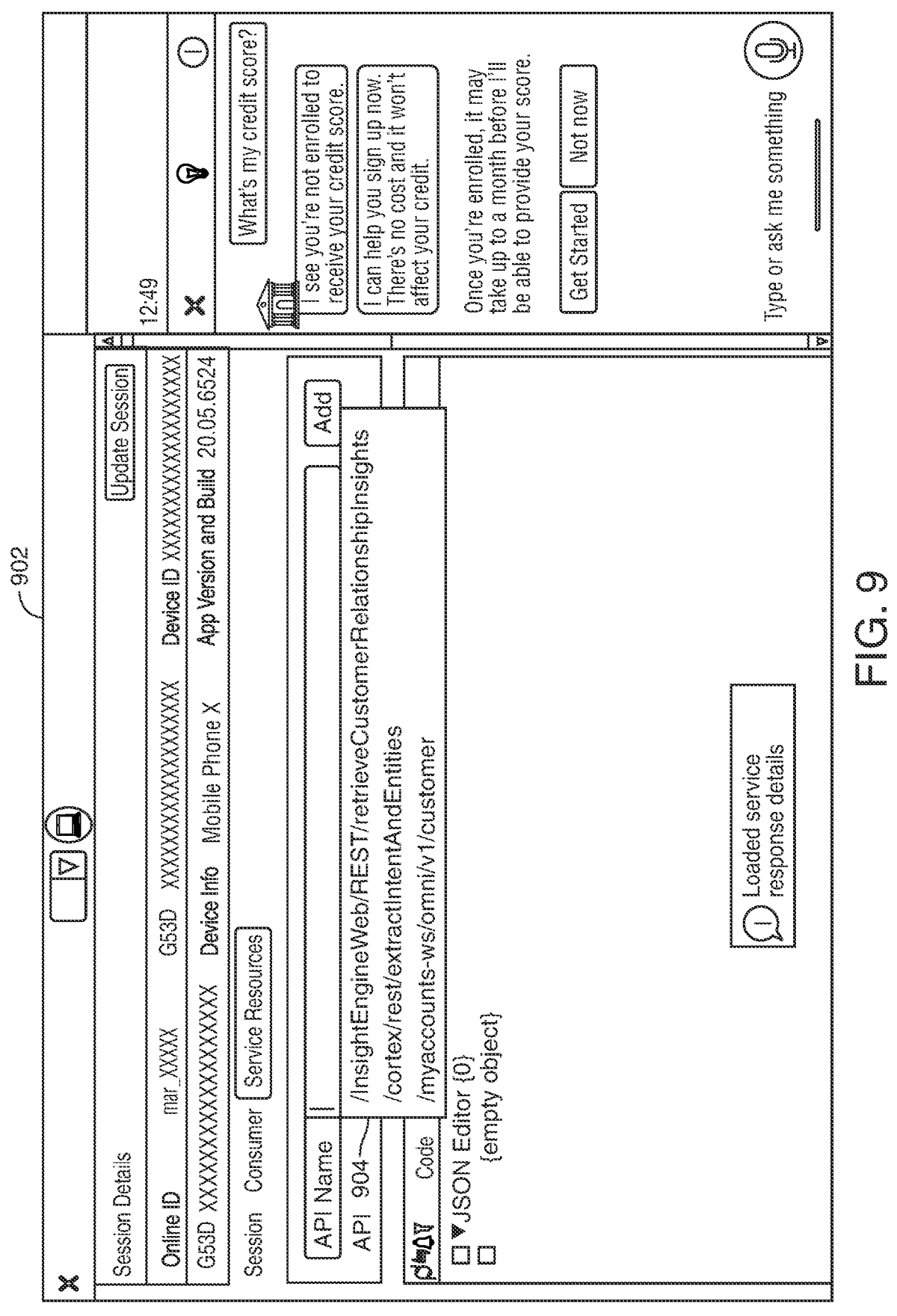

FIG. 9 shows an illustrative diagram. The illustrative diagram includes screenshot 902. Screenshot 902 shows a developer selecting an API for entry into API name entry field 904.

Figure 10:
FIG. 10 shows still another illustrative diagram in accordance with principles of the disclosure.

FIG. 10 shows an illustrative diagram. The illustrative diagram shows screenshot 1002. Screenshot 1002 shows an API name entered into API name entry field, shown at 1004. Upon selection of add button 1006, the API named in field 1004 may be imported to the active development testing session.

Figure 11:
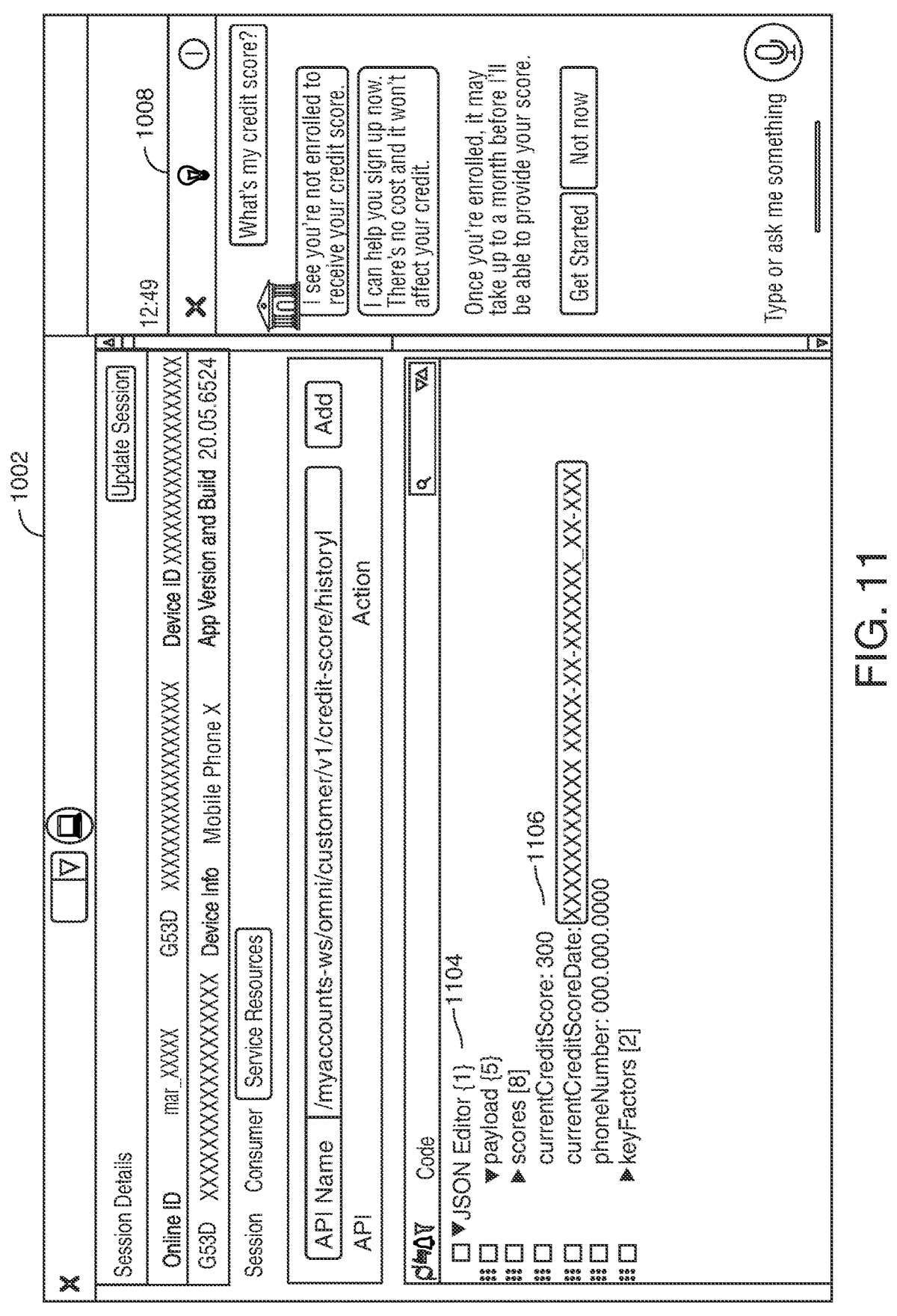

FIG. 11 shows an illustrative diagram. The illustrative diagram shows screenshot 1102. Screenshot 1102 shows the JSON editor (1104) upon importing an API.

JSON editor a current credit score attribute (1106). The current credit score attribute may interface with an attribute included in the front end, shown within the virtual assistant testing environment 1108.

Figure 12:
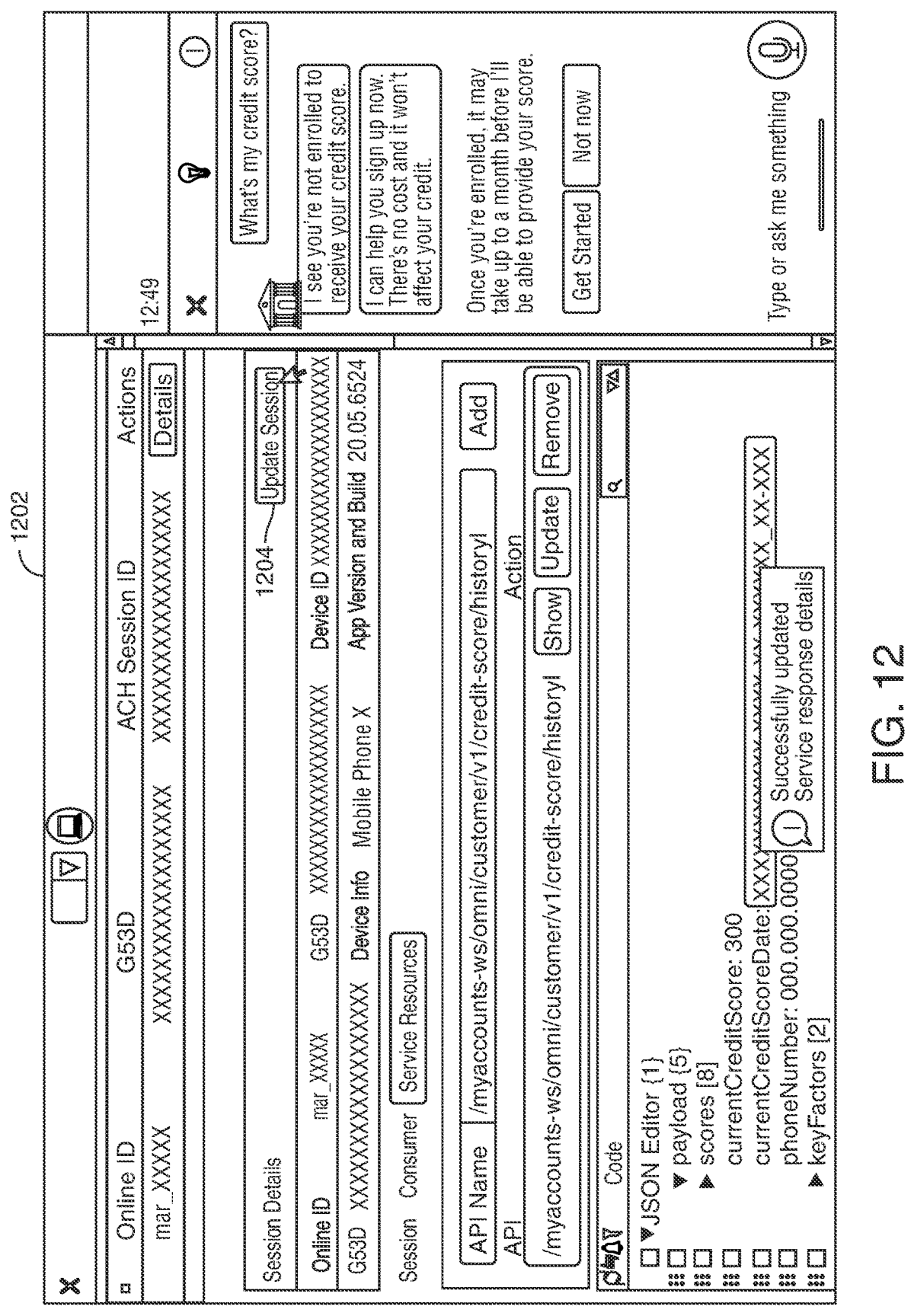

FIG. 12 shows an illustrative diagram. The illustrative diagram shows screenshot 1202. Screenshot 1202 shows the developer select update session button 1204. Upon selection of update session button 1204, the API, with any changes made by the developer, is updated into the current session.

Figure 13:
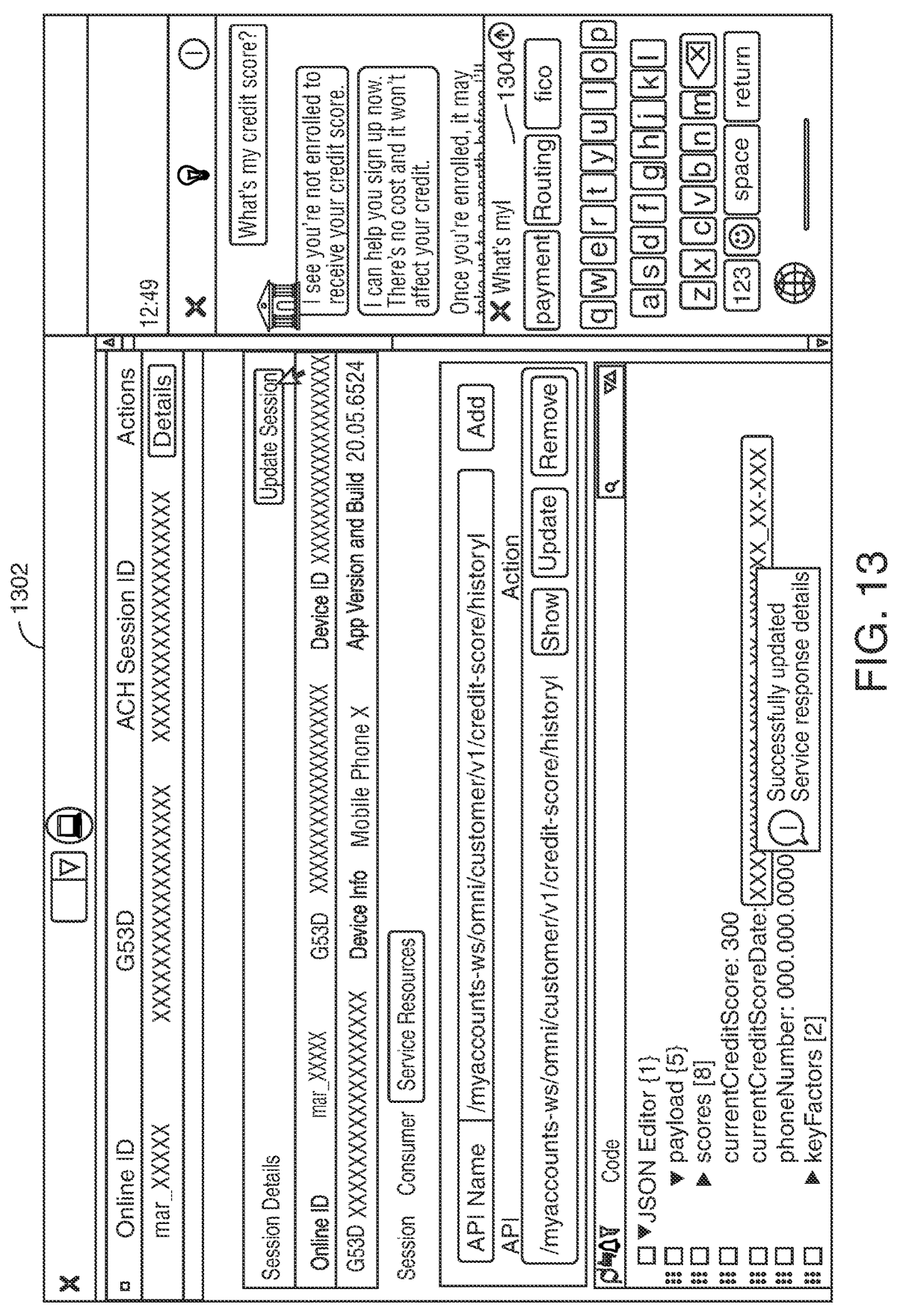

FIG. 13 shows an illustrative diagram. The illustrative diagram shows screenshot 1302. Screenshot 1302 shows the developer typing "What's my" into the virtual assistant testing environment, as shown at 1304.

Figure 14:
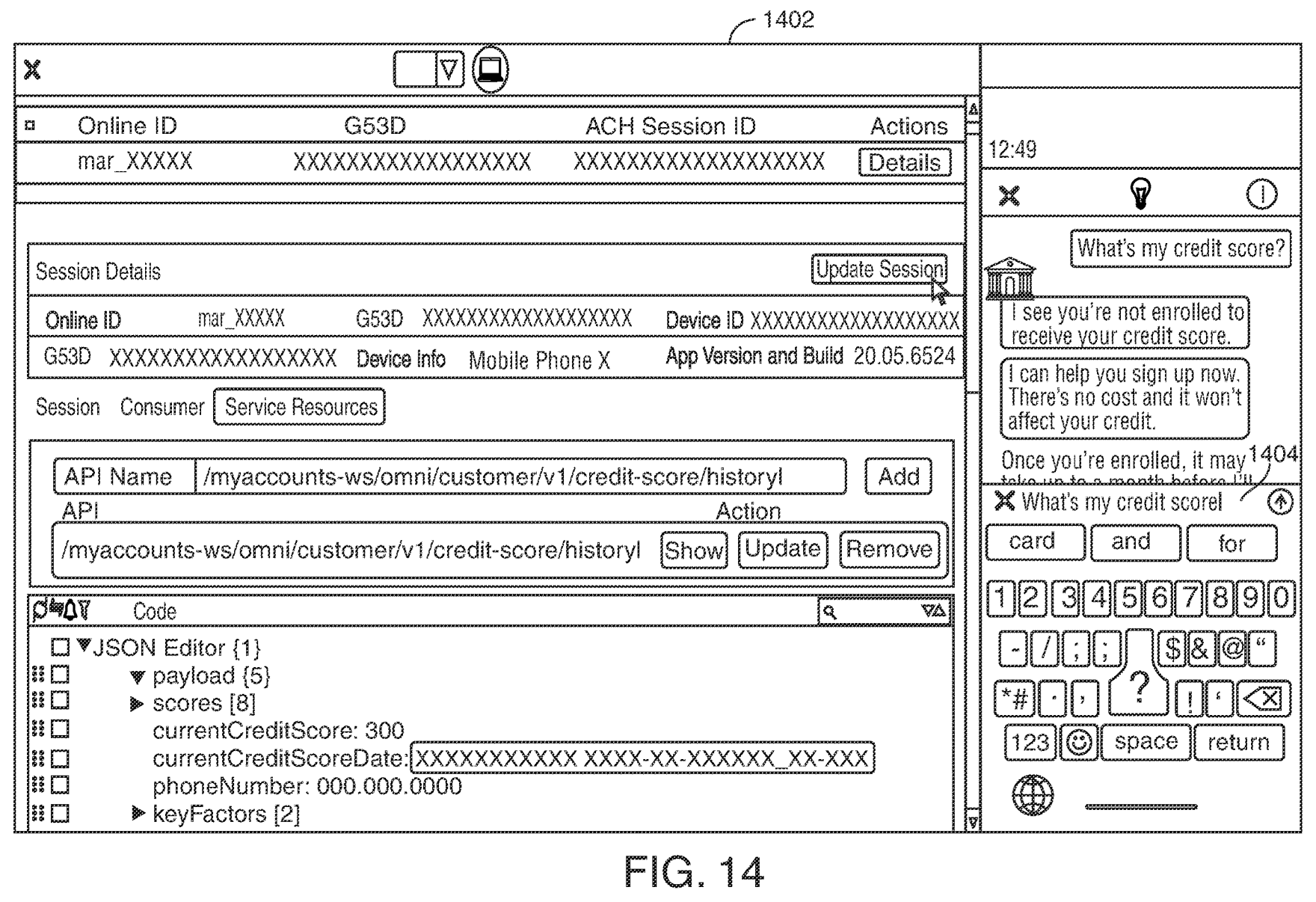

FIG. 14 shows an illustrative diagram. The illustrative diagram shows screenshot 1402. Screenshot 1402 shows the developer typing "What's my credit score." It should be appreciated that this same question was posed in FIG. 2. The answer displayed after the question was posed will be different from the answer shown after FIG. 14 because the API including the credit score information was imported into the current active session.

Figure 15:
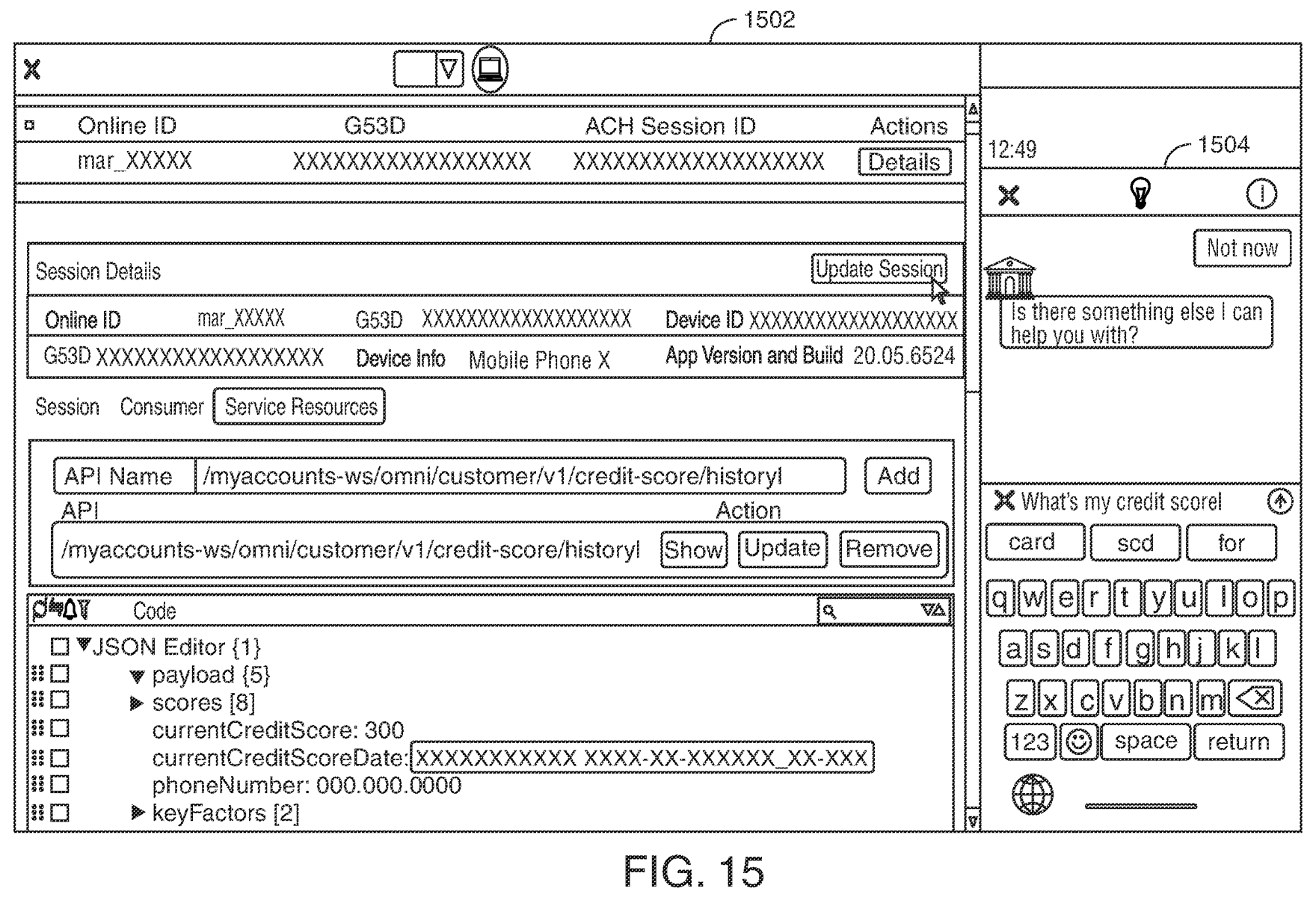

FIG. 15 shows an illustrative diagram. The illustrative diagram shows screenshot 1502. Screenshot 1502 shows a response to the question "What's my credit score?", within virtual assistant testing environment, shown at 1504. The response shown in 1504 is "Your credit score is 300 as of Oct. 21, 2016. Here's a detailed view of your credit score history."

Figure 16:
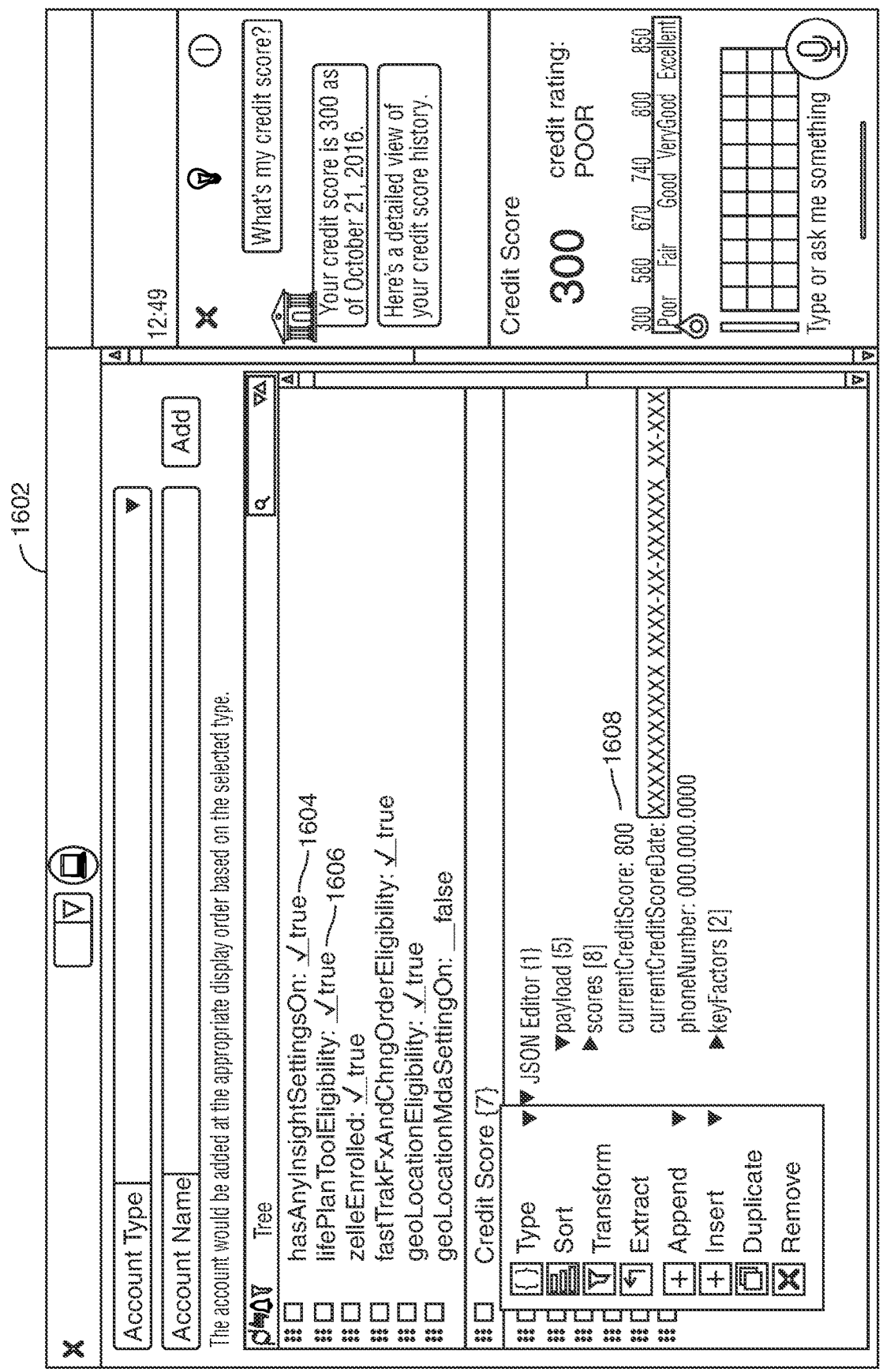
FIG. 16 shows still another illustrative diagram in accordance with principles of the disclosure.

FIG. 16 shows an illustrative diagram. The illustrative diagram shows screenshot 1602. Screenshot 1602 shows settings that may be changed within the mocked-up API. These settings may include whether the current profile has any insight settings on (1604). These settings may include whether the current profile is eligible for a life plan tool (1606).

Screenshot 1602 also shows changes made to the JSON response. As shown at 1608, the current credit score was changed to 800.

Figure 17:
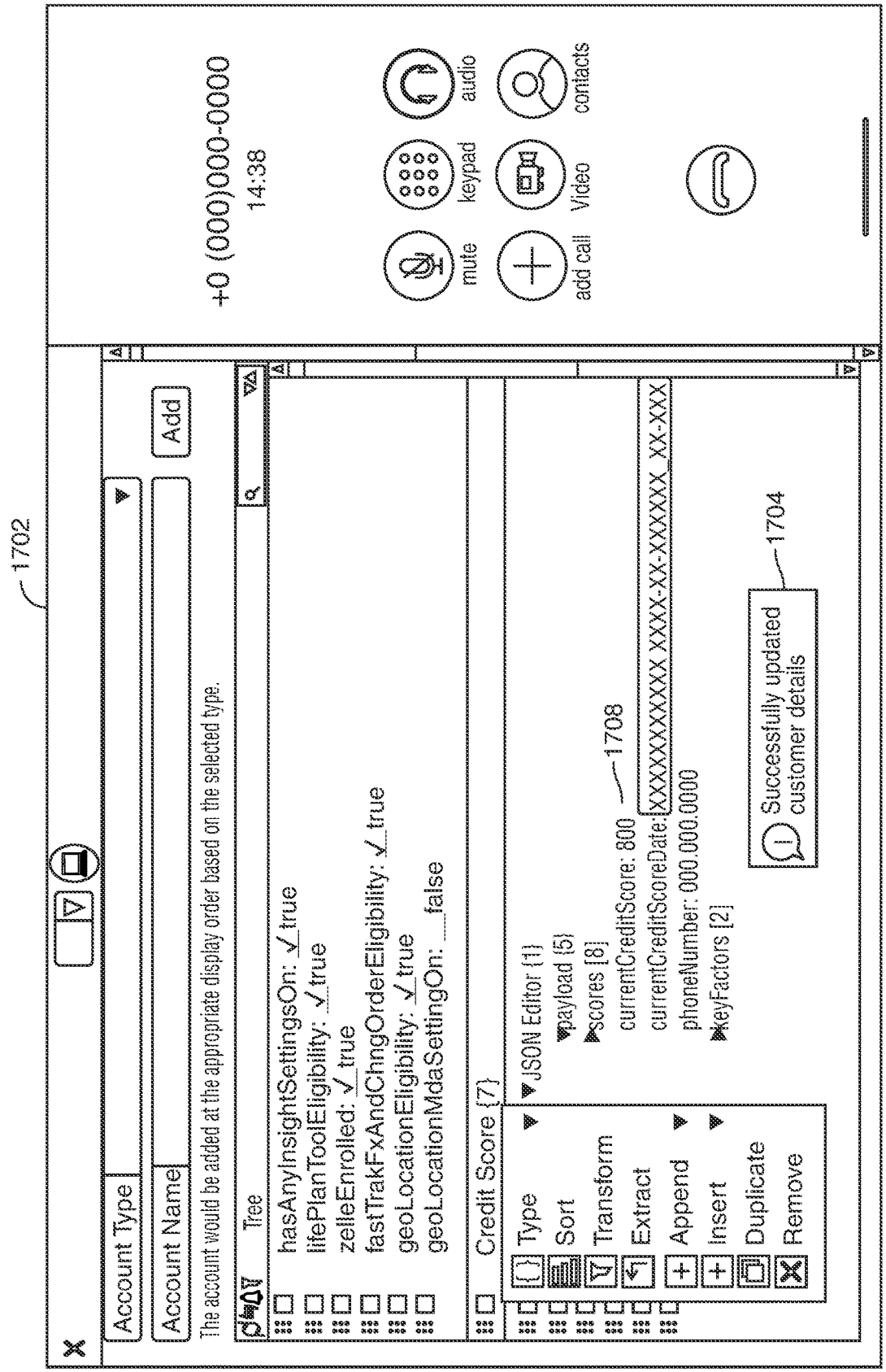
FIG. 17 shows yet another illustrative diagram in accordance with principles of the disclosure.

FIG. 17 shows an illustrative diagram. The illustrative diagram shows screenshot 1702. Screenshot 1702 indicates that the details have been updated in the current profile, as shown at 1704.

Figure 18:
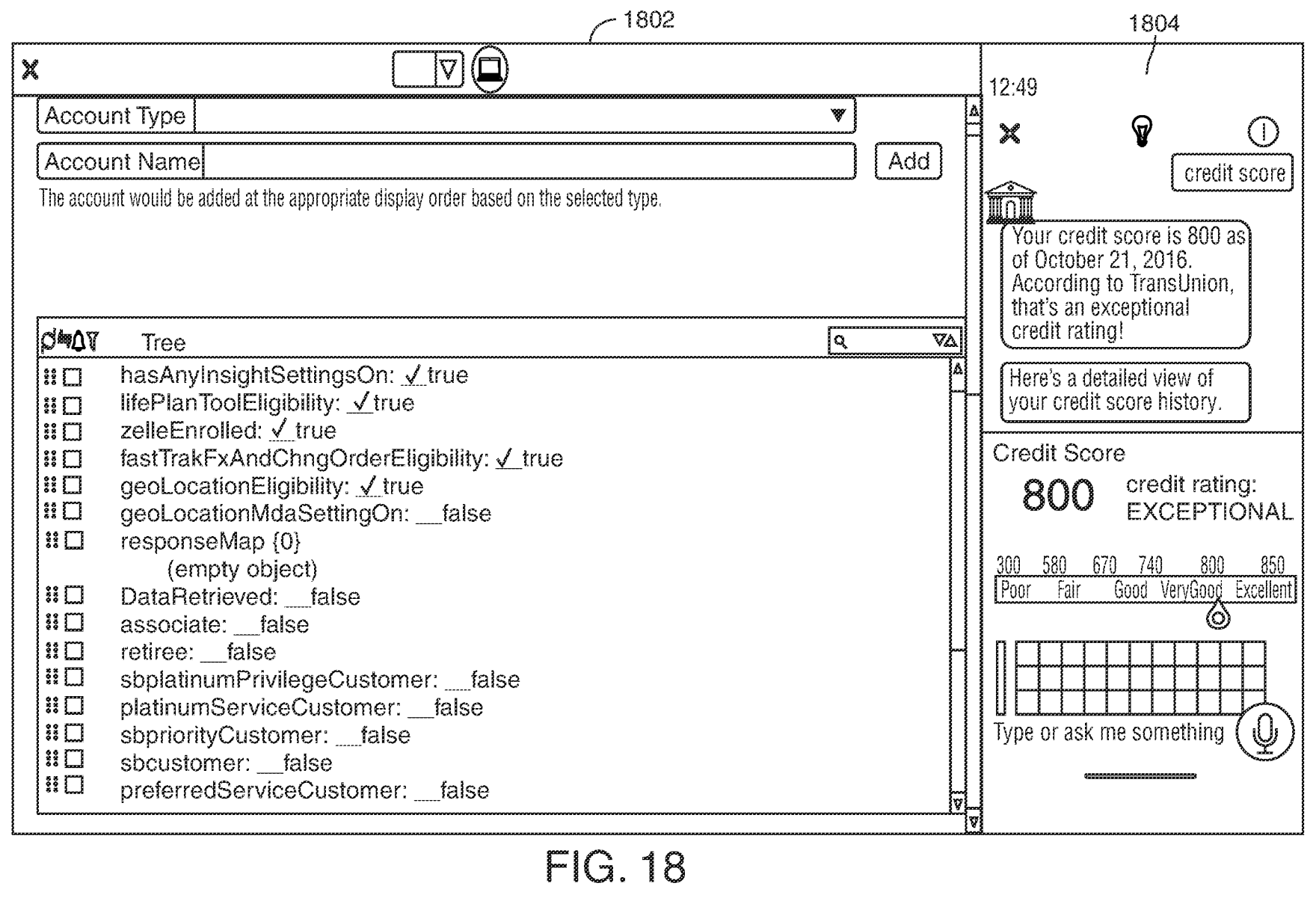

FIG. 18 shows an illustrative diagram. The illustrative diagram shows screenshot 1802. Screenshot 1802 shows, that within the virtual assistant testing environment, shown at 1804, a developer typed "credit score." The virtual assistant response included "Your credit score is 800 as of Oct. 21, 2016." As shown, the credit score changed based on the data inputted into the mocked-up API.

Figure 19:
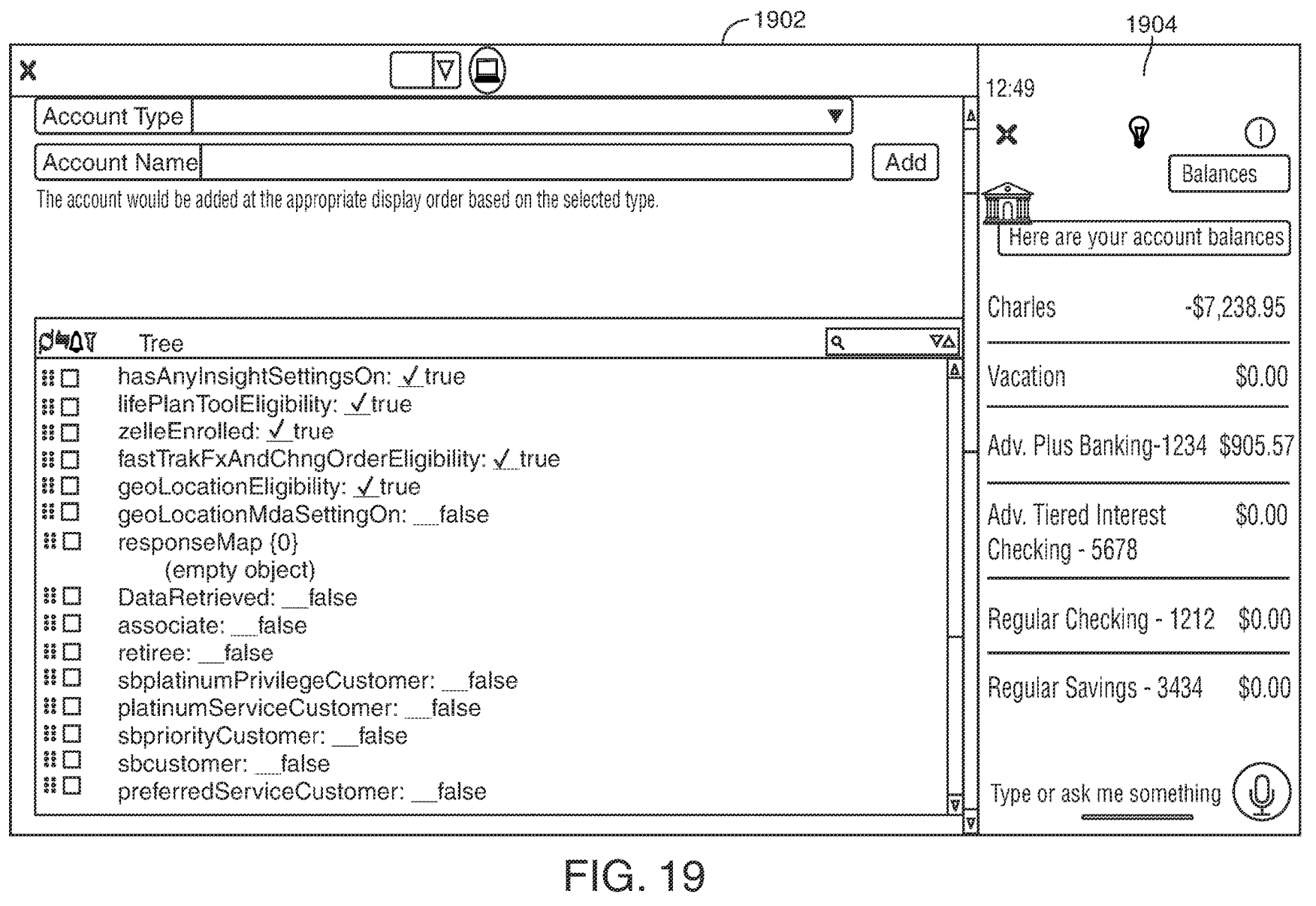

FIG. 19 shows an illustrative diagram. The illustrative diagram shows a developer type balances into the virtual assistant testing environment, shown at 1904. The virtual assistant responded with a plurality of accounts and their respective balances. The accounts include Charles, Vacation, Adv. Plus Baking, Adv. Tiered Interest Checking, Regular Checking and Regular Savings.

Figure 20:
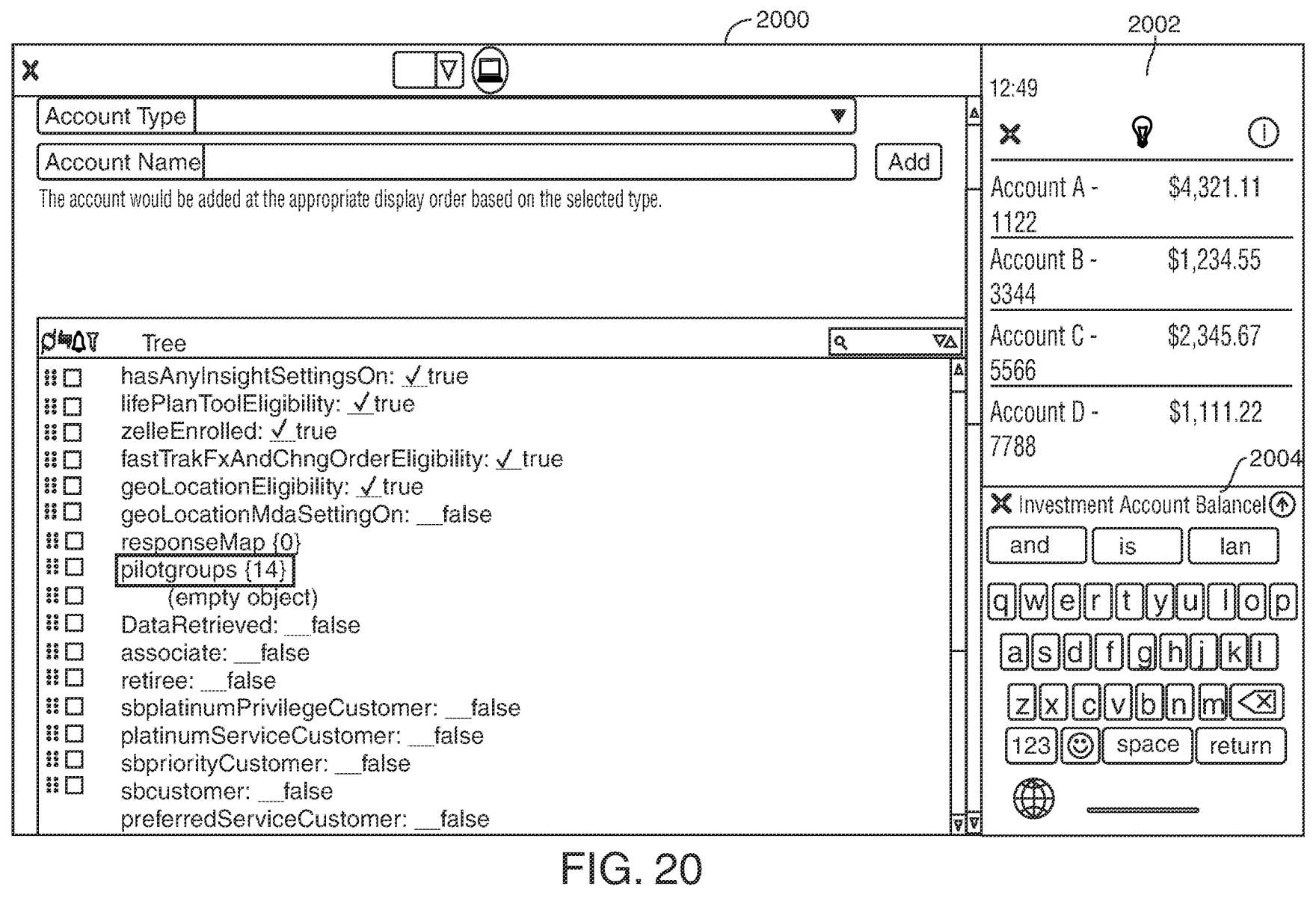

FIG. 20 shows an illustrative diagram. The illustrative diagram shows screenshot 2000. Screenshot 2000 shows a developer type "investment account balance" at 2004 within virtual assistant testing environment 2002.

Figure 21:
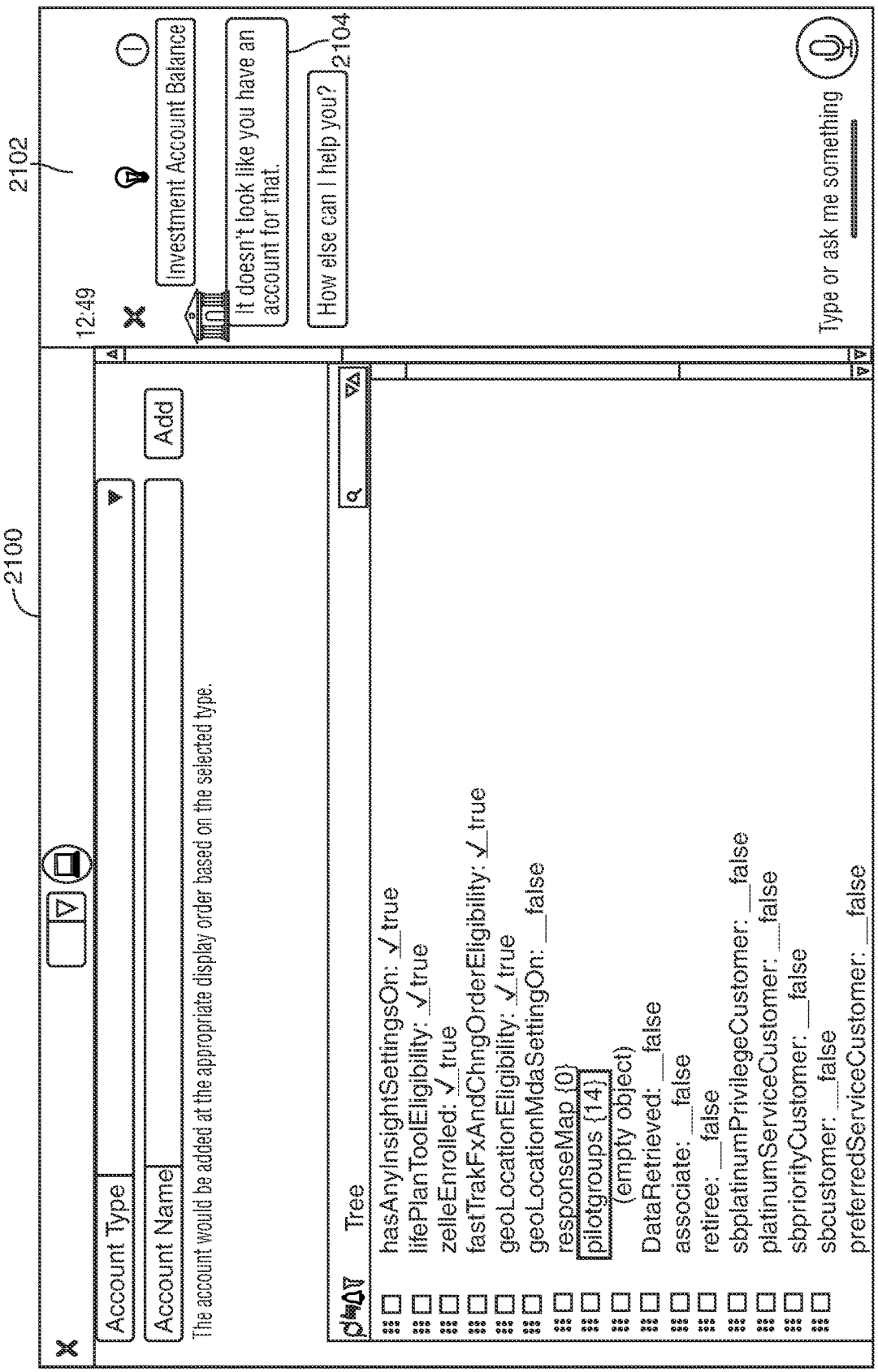
FIG. 21 shows yet another illustrative diagram in accordance with principles of the disclosure.

FIG. 21 shows an illustrative diagram. The illustrative diagram shows screenshot 2100. The response to the request made in FIG. 20 is shown within virtual assistant testing environment 2102. The response shown at 2104 is "It doesn't look like you have an account for that. How else can I help you." It is apparent that the current profile may not include an investment account. Therefore, the developer may be unable to test the virtual assistant with test relating to an investment account. As such, the developer may add an investment account to the current profile in order to effectively test the virtual assistant.

Figure 22:
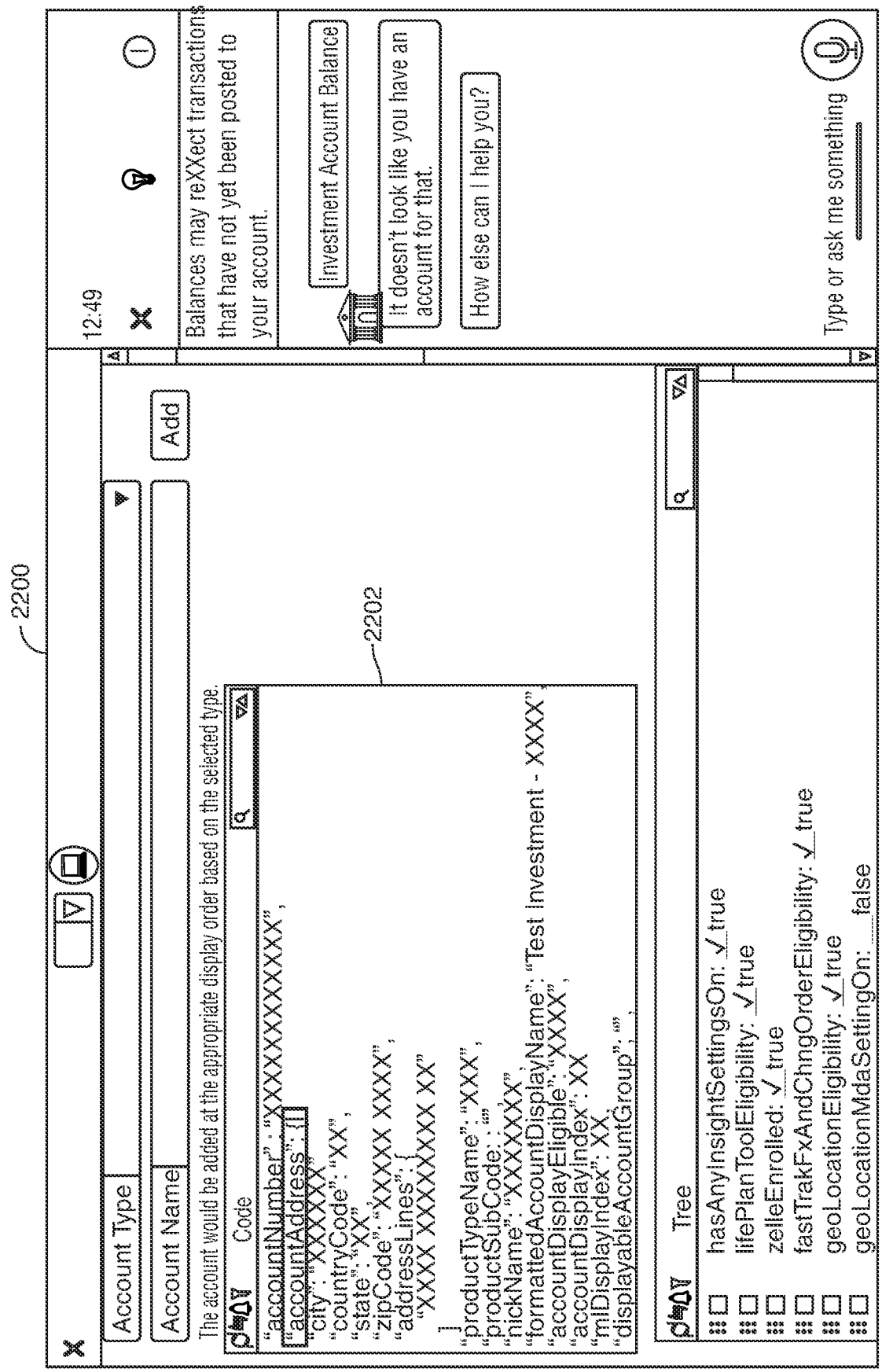
FIG. 22 shows still another illustrative diagram in accordance with principles of the disclosure.

FIG. 22 shows an illustrative diagram. Screenshot 2200 includes an API shown at 2202. The API shown may include details relating to an investment account to be added to the current profile.

Figure 23:
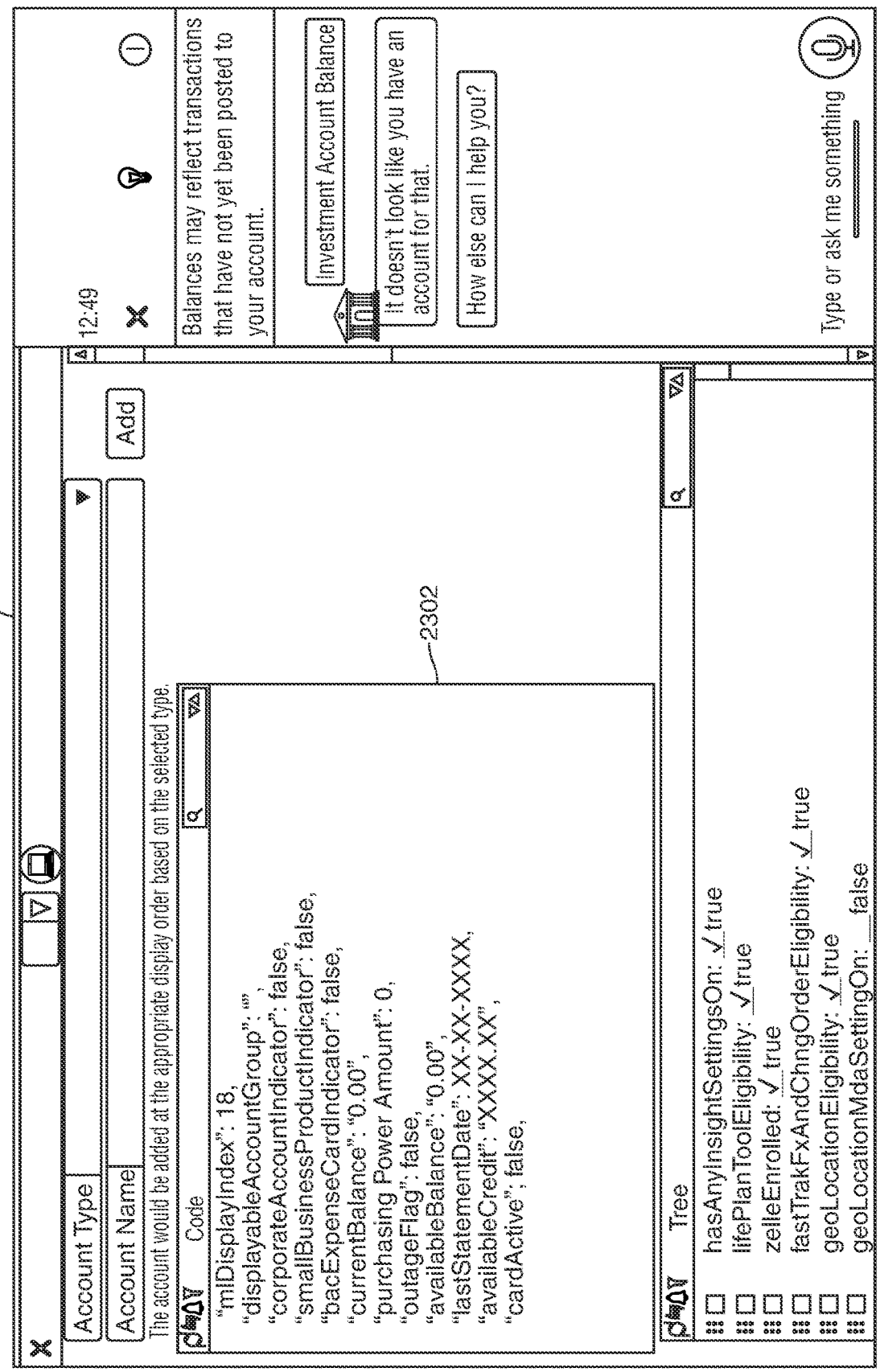
FIG. 23 shows yet another illustrative diagram in accordance with principles of the disclosure.

FIG. 23 shows an illustrative diagram. The illustrative diagram shows screenshot 2300. Screenshot 2300 includes an API, shown at 2303. The API, shown at 2303, includes details relating to an investment account to be added to the current profile.

Figure 24:
FIG. 24 shows still another illustrative diagram in accordance with principles of the disclosure.

FIG. 24 shows an illustrative diagram. The illustrative diagram shows screenshot 2400. Screenshot 2400 includes virtual assistant testing environment 2402. Virtual assistant testing environment 2402 shows that an investment account, shown at 2404, is added to the previous list of accounts.

Figure 25:
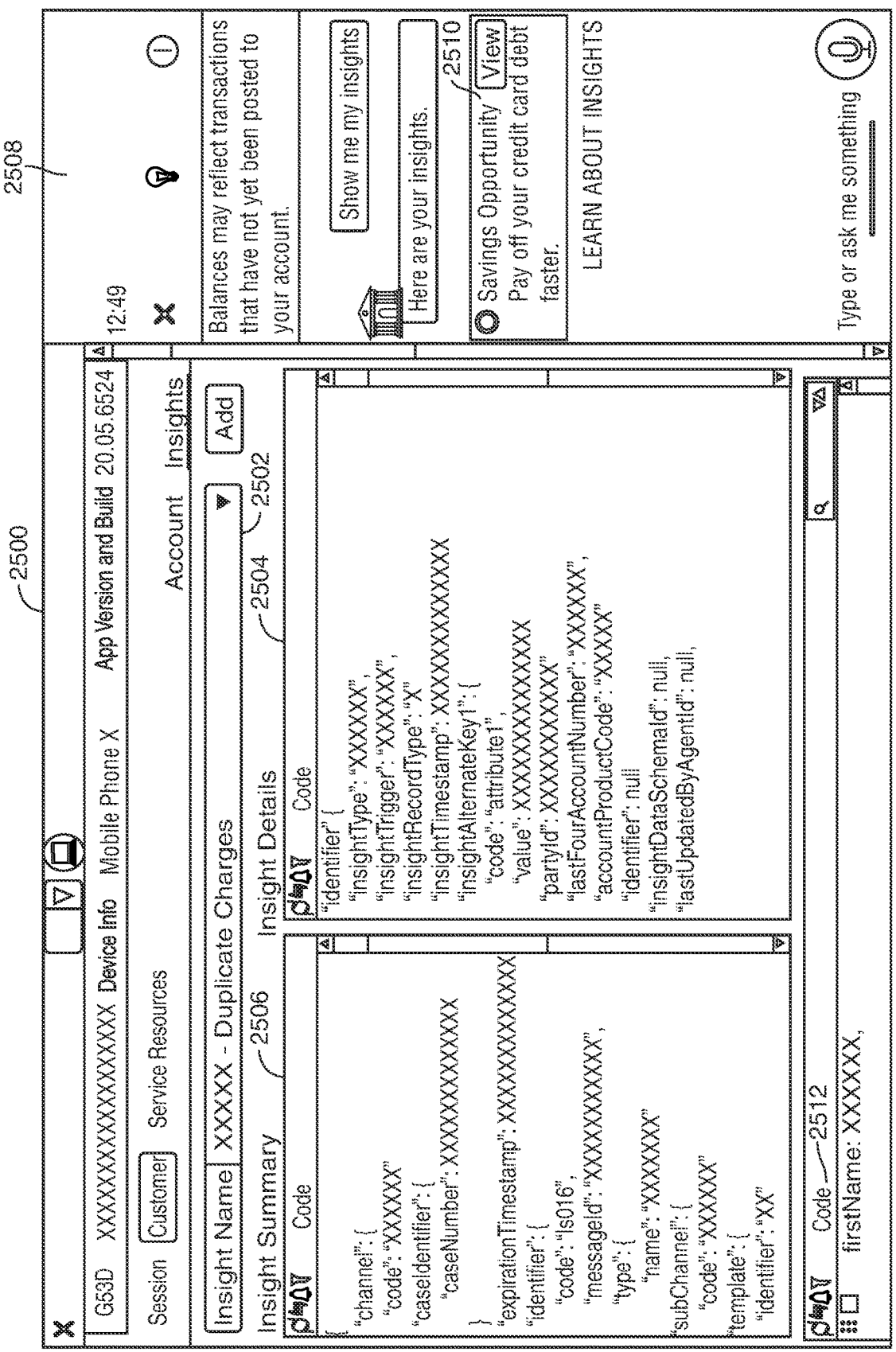
FIG. 25 shows yet another illustrative diagram in accordance with principles of the disclosure.

FIG. 25 shows an illustrative diagram. The illustrative diagram shows screenshot 2500. Screenshot 2500 include virtual assistant testing environment 2508. Virtual assistant testing environment 2508 may receive a request to show me my insights. The virtual assistant may display the insights, as shown at 2510. The insight may include data relating to a savings opportunity.

Screenshot 2500 may also show a developer adding an insight to the mocked-up server. The additional insight may be duplicate charges, as shown at 2502. A computer code summary of the insight may be shown at 2506. A computer code detailed description of the insight may be shown at 2504. A computer code description of the personal data included in the mocked-up profile may be shown at 2512.

Figure 26:
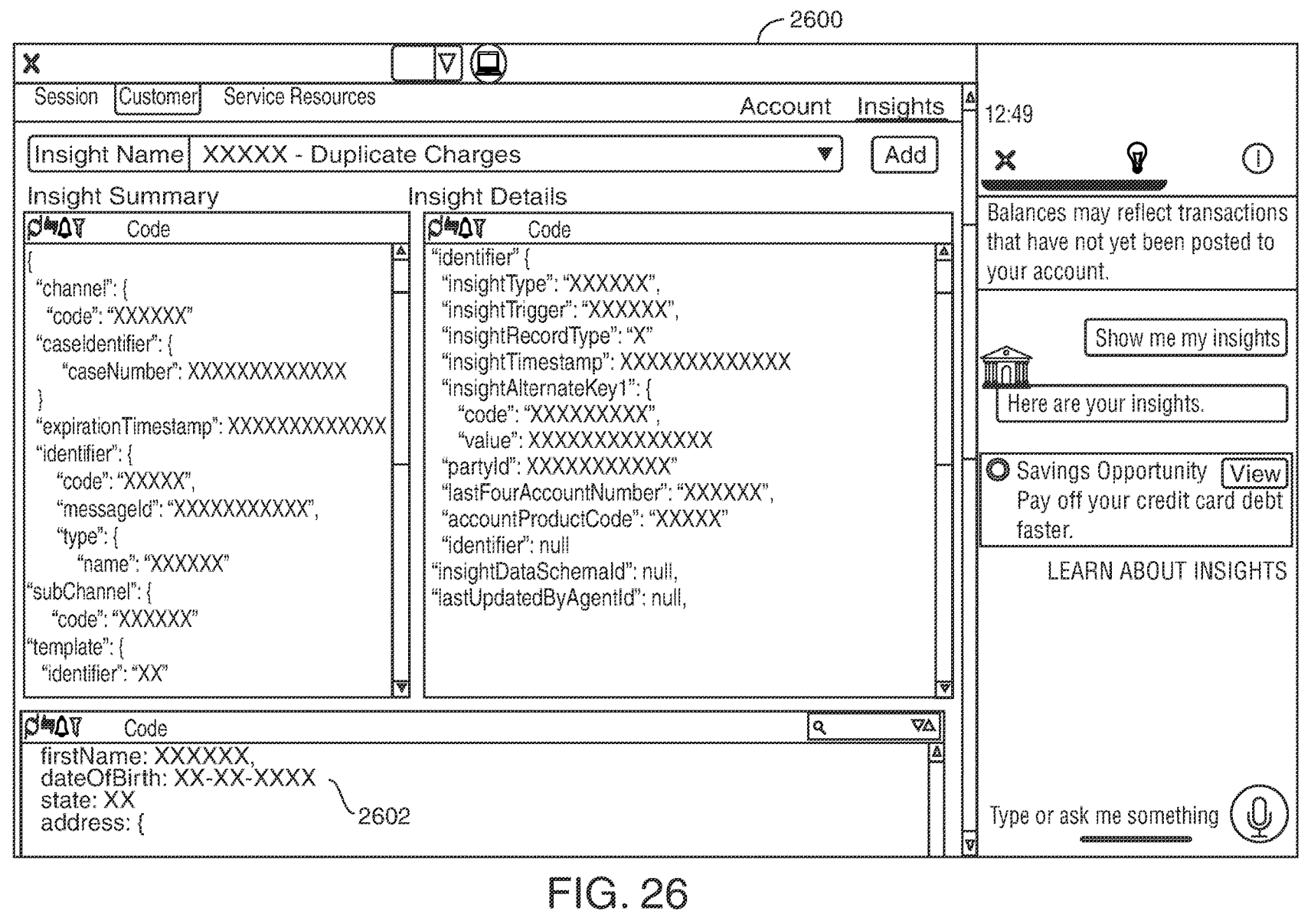

FIG. 26 shows an illustrative diagram. The illustrative diagram shows screenshot 2600. Screenshot 2600 includes detailed computer code description of the personal data included in the mocked-up profile 2602. Mocked-up profile 2602 may include more detail than mocked-up profile 2512 included in FIG. 25.

FIG. 27 shows an illustrative diagram. The illustrative diagram includes screenshot 2700. Screenshot 2700 includes virtual assistant testing environment 2702. It should be appreciated that duplicate charges insight 2704 has been added to virtual assistant testing environment 2702. As such, two insights are shown in FIG. 27. A first insight may be duplicate charges, shows at 2704, and savings opportunity, shown at 2706.

Figure 28:
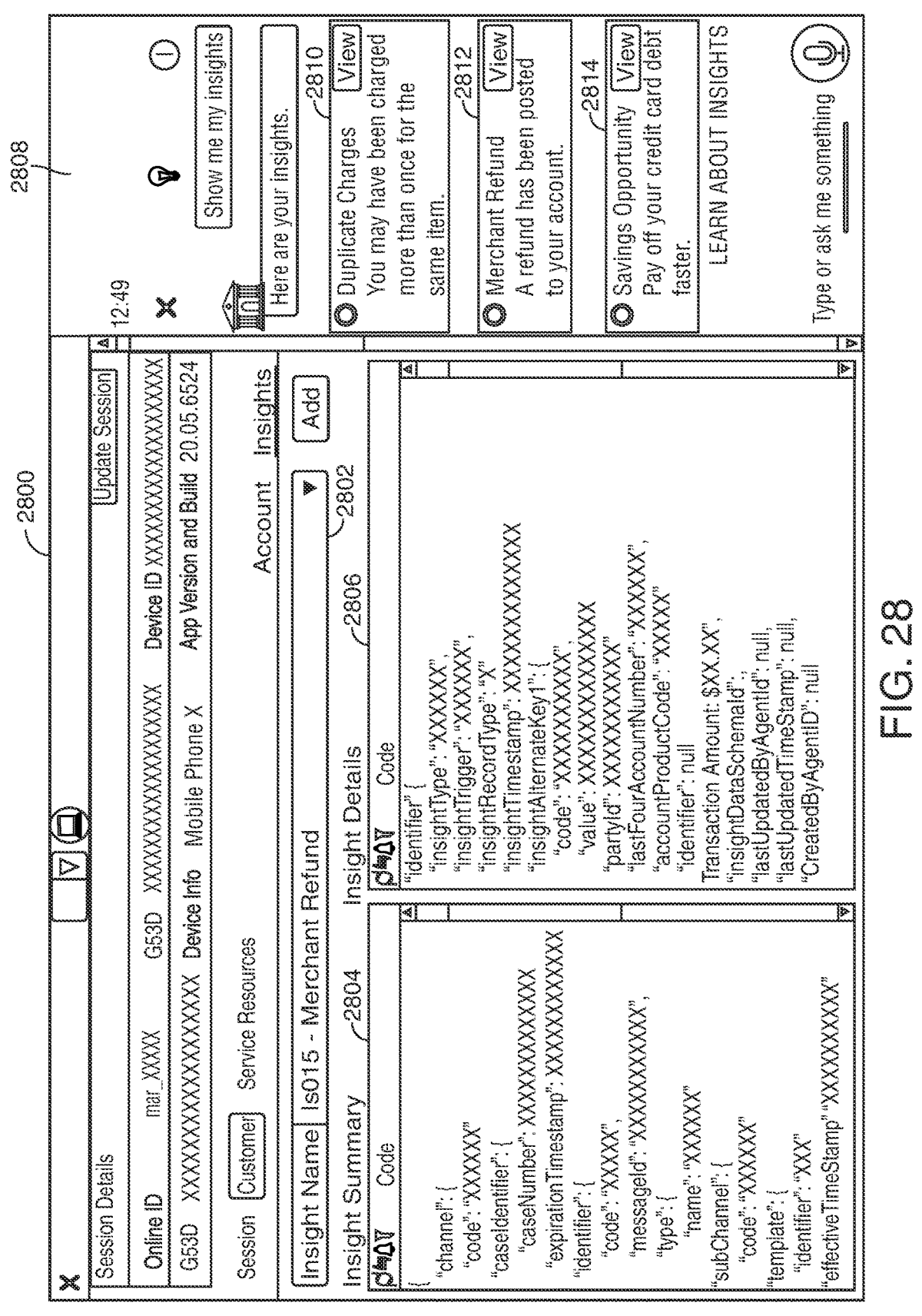

FIG. 28 shows an illustrative diagram. The illustrative diagram includes screenshot 2800. Screenshot 2800 shows the addition of a third insight, as shown within virtual assistant testing environment, shown at 2808. The insights shown include duplicate charges 2810, merchant refund 2812 and savings opportunity 2814.

The additional insight—merchant refund, shown at 2812 may have been added to the mocked-up services server. The insight name may be added to insight name entry field, shown at 2802. The insight summary may be shown at 2804. The insight details may be shown at 2806.

Figure 29:
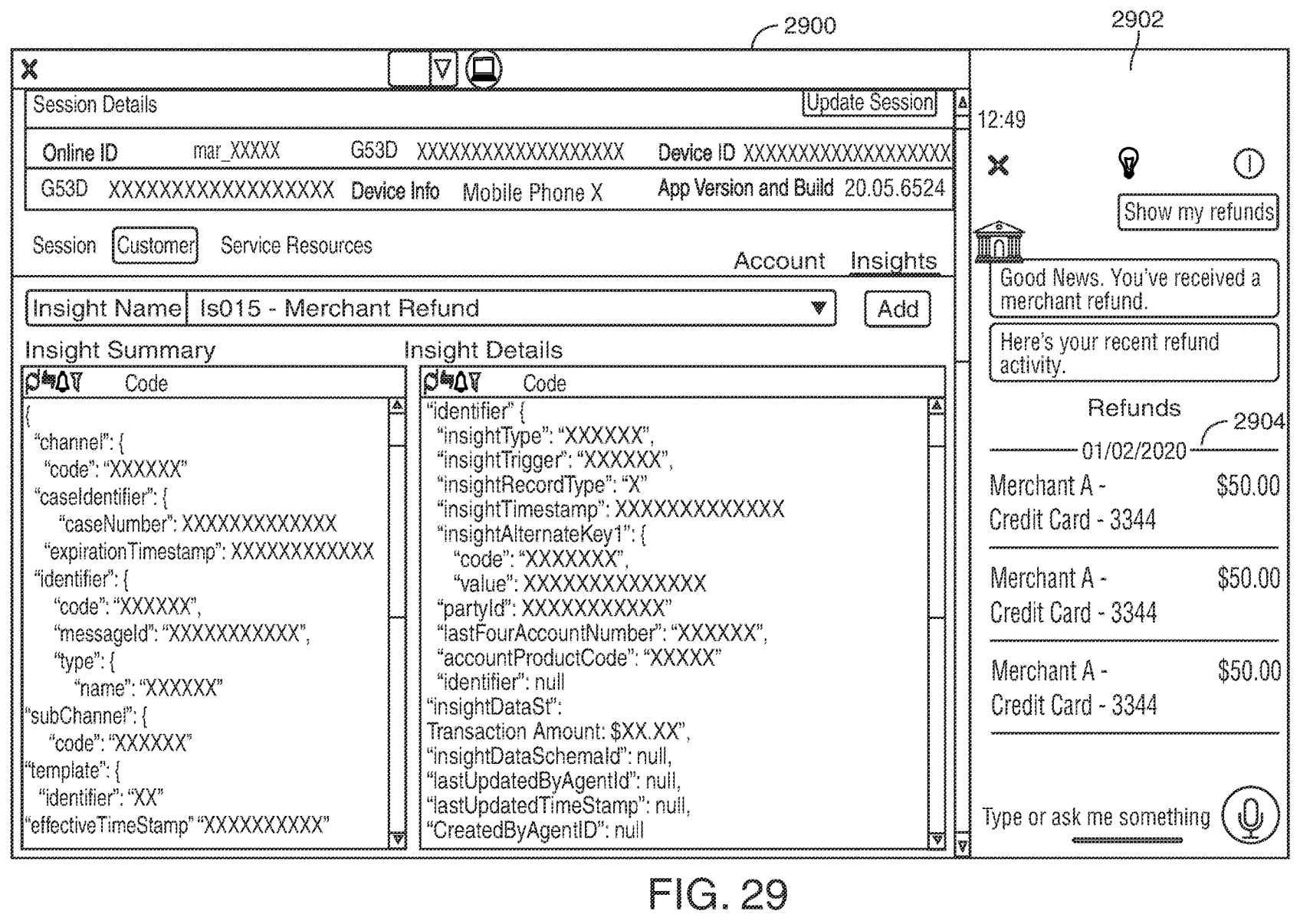

FIG. 29 shows an illustrative diagram. The illustrative diagram includes virtual assistant testing environment 2902. Virtual assistant testing environment 2902 shows a request for more detailed information regarding one of the insights—merchant refund. The virtual assistant displays the recent refund activity, as shown at 2904. Any other suitable insights may also be contemplated within the scope of this disclosure.

Thus, a system for real-time management of session objects and for application programming interface (API) mocking is provided.

What is claimed is:

1. A method for real-time management of a plurality of session objects and for replicating, to a minimum degree sufficient to maintain a virtual assistant application, a plurality of application programming interfaces (APIs), the method comprising:

receiving, at a backend services server cluster, the backend services server cluster comprising the plurality of APIs, an API request, from a virtual assistant testing environment;

re-routing the API request from the backend services server cluster to a mocked-up services server located at a remote location from the backend services server cluster, the mocked-up services server is a server that replicates, to the extent necessary to operate an executable executing within the virtual assistant testing environment, the cluster of backend services servers, the replicating comprising replicating a human-like profile, said human-like profile comprising a first name, a date of birth, a state of residence and address information;

processing, at the mocked-up services server, a JavaScript Object Notation (JSON) response to the API request, the JSON response comprising real-time data, the real-time data being based on a profile active at the mocked-up services server;

transmitting the JSON response, from the mocked-up services server to the virtual assistant testing environment, said transmitting being injected into a JSON response channel, said JSON response channel for communications between the backend services server cluster and the virtual assistant testing environment; and modifying, within the virtual assistant testing environment, one or more of a plurality of HTTP session objects at the virtual assistant application, using the received JSON response, wherein the virtual assistant testing environment is unaware of the rerouting of the request and an origin on the JSON response.

2. The method of claim 1, wherein the virtual assistant testing environment is executed on a computing device.

3. The method of claim 1, wherein the computing device is a mobile device comprising a processor, a transmitter, and a receiver.

4. The method of claim 2, wherein the computing device is operable to execute a virtual assistant testing environment and a virtual assistant production environment.

5. The method of claim 4, wherein, when the computing device is executing the virtual assistant production environment, the backend services server cluster:
receives the API request;
processes the API request; and
transmits a JSON response to the virtual assistant production environment.

6. A system for real-time management of a plurality of session objects and for replicating, to a minimum degree in order to maintain operability of a virtual assistant application, a plurality of application programming interfaces (APIs), the system comprising:
a cluster of backend services servers, each backend services server included in the cluster of backend services servers is operable to provide a backend service to a virtual assistant, each backend service that executes at least one API from among the plurality of APIs;
a computing device comprising a processor coupled to a memory, said computing device operable to execute the virtual assistant in a test mode;
a communication channel between the computing device and the cluster of backend services servers, said communication channel operable to transmit:
a plurality of API requests from the virtual assistant to the cluster of backend services servers; and
a plurality of JavaScript Object Notation (JSON) responses from the cluster of backend services servers to the computing device;
a mocked-up services server, the mocked-up services server is a server operable to replicate, to the extent necessary to operate an executable executing on the virtual assistant in the test mode, the cluster of backend services servers, the replicating comprising replicating a human-like profile, said human-like profile comprising a first name, a date of birth, a state of residence and address information;
a bypass communication channel between the communication channel and the mocked-up services server; and wherein:

the bypass communication channel is activated when the virtual assistant is executed in test mode, the bypass communication channel:
redirects the plurality of API requests received from the virtual assistant to the mocked-up services server; and
redirects the plurality of JSON responses from the backend services servers to the computing device; and
the virtual assistant modifies one or more HTTP session objects using the received JSON responses.

7. The system of claim 6, wherein the computing device is a mobile device comprising a processor, a transmitter, and a receiver.

8. The system of claim 6, wherein the computing device is operable to execute the virtual assistant in a production mode.

9. The system of claim 8, wherein, in the production mode, the backend services servers receive the API request, process the API request and transmit a JSON response to the API request.

10. A system for real-time management of a plurality of Hypertext Transfer Protocol (HTTP) session objects and attributes and for replicating, to a minimum degree in order to maintain a virtual assistant application, a plurality of backend application programming interfaces (APIs) with which the plurality of HTTP session objects and attributes interface, the system comprising:
a computing device comprising a processor coupled to a memory, said computing device operable to execute a virtual assistant computing application in a test mode, the virtual assistant computing application operable to:
utilize the plurality of HTTP session objects and attributes during execution;
transmit a plurality of API requests to a cluster of backend services servers;
receive a plurality of JavaScript Object Notation (JSON) responses from a mocked-up services server, the mocked-up services server is a server that replicates, to the extent necessary to operate an executable executing within the virtual assistant computing application, the cluster of backend APIs, the replicating comprising replicating a human-like profile, said human-like profile comprising a first name, a date of birth, a state of residence and address information, the JSON responses being in response to the plurality of API requests; and
modify one or more HTTP session objects at the virtual assistant, said HTTP session objects that are modified by the plurality of JSON responses.

11. The system of claim 10, wherein the JSON responses are stubs.

12. The system of claim 10, wherein the computing application is duped to identify the origin of the JSON responses as the cluster of backend services servers.

13. The system of claim 10, wherein the mocked-up services server is operable to replicate, to the extent necessary to operate an executable of the computing application in the test mode.

14. The system of claim 10, wherein the system reroutes the plurality of API requests to the mocked-up services server prior to the cluster of backend services servers receiving the plurality of API requests.

15. The system of claim 10, wherein the computing application is further operable to execute the virtual assistant in a production mode.

16. The system of claim 15, wherein in the production mode, the cluster of backend services servers is operable to process the plurality of API requests and transmit JSON responses that correspond to the plurality of API requests to the computing application.

17. The system of claim 10, wherein each of the plurality of JSON responses comprise real-time data, the real-time data being based on a profile active at the mocked-up services server.

18. The system of claim 10, wherein the computing device is a mobile device comprising a processor, a transmitter, and a receiver.

* * * * *